United States Patent
Fujita

(10) Patent No.: US 10,126,147 B2
(45) Date of Patent: Nov. 13, 2018

(54) ROTATION ANGLE DETECTION DEVICE

(71) Applicant: JTEKT CORPORATION, Osaka-shi, Osaka (JP)

(72) Inventor: Yuji Fujita, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 322 days.

(21) Appl. No.: 14/952,365

(22) Filed: Nov. 25, 2015

(65) Prior Publication Data
US 2016/0161289 A1 Jun. 9, 2016

(30) Foreign Application Priority Data

Dec. 5, 2014 (JP) .................. 2014-247213

(51) Int. Cl.
| | |
|---|---|
| *G01B 7/00* | (2006.01) |
| *G01B 7/30* | (2006.01) |
| *G01D 5/14* | (2006.01) |
| *G01D 5/16* | (2006.01) |
| *G01D 5/244* | (2006.01) |

(Continued)

(52) U.S. Cl.
CPC ............ *G01D 5/16* (2013.01); *G01D 5/145* (2013.01); *G01D 5/245* (2013.01); *G01D 5/2448* (2013.01); *G01D 5/24471* (2013.01); *G01D 5/24476* (2013.01); *H02P 6/16* (2013.01)

(58) Field of Classification Search
CPC ... G01B 7/00; G01B 7/30; G01D 5/14; G01D 5/16; G01D 5/244; G01D 5/245; G01R 33/02; G01R 33/06; G01R 33/09; H02K 3/12; H02K 3/28
See application file for complete search history.

(56) References Cited

U.S. PATENT DOCUMENTS

| | | | | |
|---|---|---|---|---|
| 5,930,905 A | * | 8/1999 | Zabler ................. | G01D 5/04 33/1 PT |
| 7,135,860 B2 | * | 11/2006 | Miya .................. | G01D 5/2046 310/168 |

(Continued)

FOREIGN PATENT DOCUMENTS

| | | |
|---|---|---|
| DE | 202009016539 U1 | 5/2010 |
| EP | 1580534 A1 | 9/2005 |
| JP | 2012-202906 A | 10/2012 |

OTHER PUBLICATIONS

Jan. 22, 2016 Extended Search Report issued in European Patent Application No. 15197340.1.

*Primary Examiner* — Neel Shah
(74) *Attorney, Agent, or Firm* — Oliff PLC

(57) ABSTRACT

A rotation angle detection device is provided which can detect a mechanical angle of a motor having any number of pole pairs. An electrical angle detected by an AMR sensor is multiplied by ½. In the mechanical angle region of 180° to 360° where the output of the AMR sensor does not match the output of a GMR sensor, there is an offset difference of 180° between the electrical angle of the AMR sensor and the electrical angle of the GMR sensor. In this case, an offset value of 180° is added to the electrical angle of the AMR sensor. Adding the offset value in this region makes the output of the AMR sensor match the output of the GMR sensor. The AMR sensor is thus corrected. A calculated angle of the AMR sensor which is obtained by the correction is detected according to a change in mechanical angle.

13 Claims, 14 Drawing Sheets

(51) Int. Cl.
*G01D 5/245* (2006.01)
*G01R 33/02* (2006.01)
*G01R 33/06* (2006.01)
*G01R 33/09* (2006.01)
*H02K 3/12* (2006.01)
*H02K 3/28* (2006.01)
*H02P 6/16* (2016.01)

(56) References Cited

U.S. PATENT DOCUMENTS

| | | | |
|---|---|---|---|
| 8,558,534 B2* | 10/2013 | Tomita | B62D 5/0484 |
| | | | 318/609 |
| 2009/0315544 A1* | 12/2009 | Takahashi | F16C 41/007 |
| | | | 324/207.25 |
| 2011/0121824 A1 | 5/2011 | Sterling | |
| 2012/0249127 A1* | 10/2012 | Sakamoto | G01D 5/24471 |
| | | | 324/207.21 |
| 2013/0335070 A1* | 12/2013 | Abe | G01B 7/30 |
| | | | 324/207.13 |
| 2014/0191628 A1* | 7/2014 | Nakano | H02K 3/28 |
| | | | 310/68 B |
| 2015/0022191 A1* | 1/2015 | Ausserlechner | G01R 33/02 |
| | | | 324/207.21 |
| 2015/0362335 A1* | 12/2015 | Spitzer | G01B 7/30 |
| | | | 310/68 B |
| 2016/0336837 A1* | 11/2016 | Ohnishi | H02K 11/215 |

* cited by examiner

F I G . 1
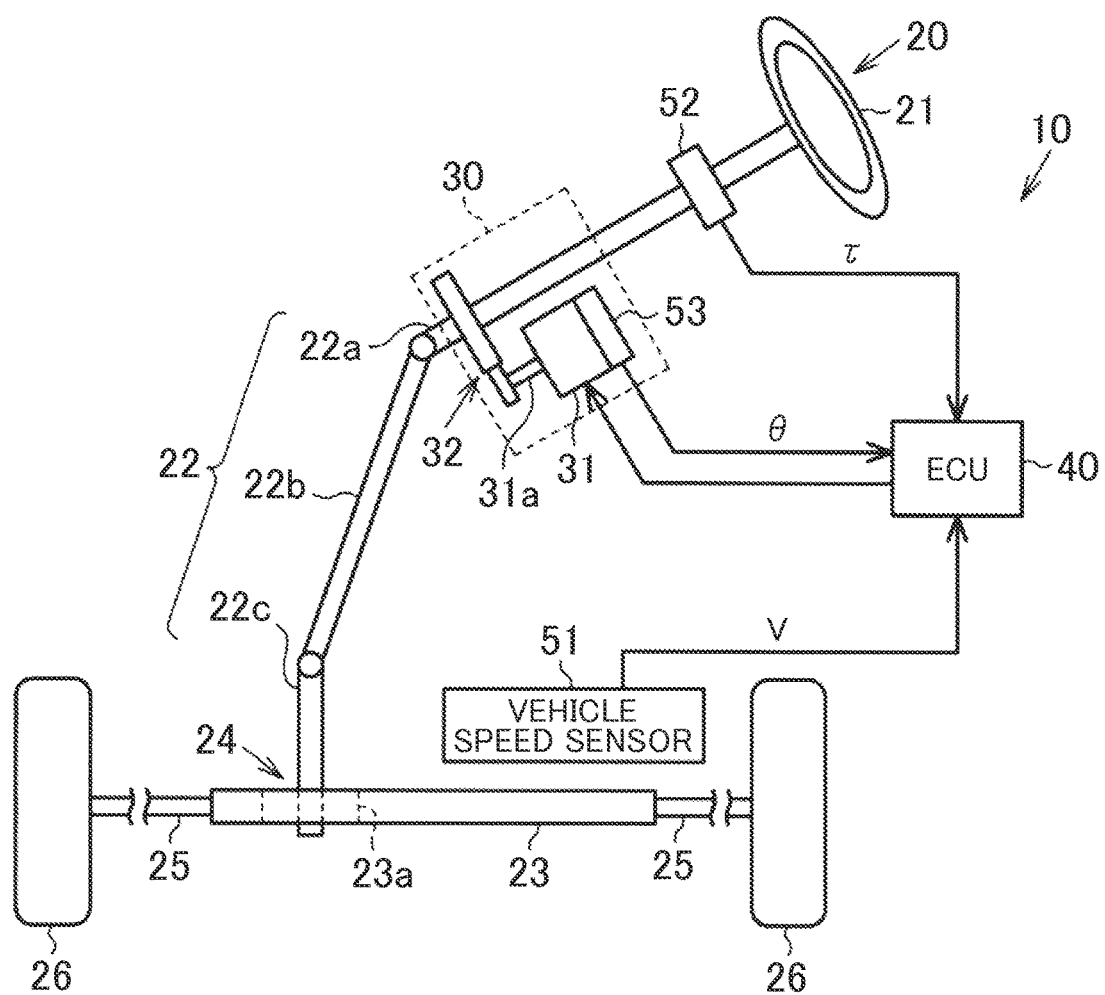

ROTATION ANGLE DETECTION DEVICE

INCORPORATION BY REFERENCE

The disclosure of Japanese Patent Application No. 2014-247213 filed on Dec. 5, 2014 including the specification, drawings and abstract, is incorporated herein by reference in its entirety.

BACKGROUND OF THE INVENTION

1. Field of the Invention

The invention relates to rotation angle detection devices.

2. Description of the Related Art

Conventionally, a resolver having a shaft angle multiplier of 1× is known as an example of rotation angle detection devices that detect the rotation angle (mechanical angle) of a motor mounted on automobiles or electric apparatuses. The resolver having a shaft angle multiplier of 1× outputs an electrical signal whose electrical angle (phase of an output signal) changes by one period for one period (360 degrees) of a mechanical angle. As described in Japanese Patent Application Publication No. 2012-202906 (JP 2012-202906 A), a rotation angle detection device is proposed which includes a resolver and a magnetoresistive (MR) sensor in order to improve redundancy and in which the difference in shaft angle multiplier between the resolver and the MR sensor is set to 1.

Although there are various types of rotation angle detection devices including the above rotation angle detection device, the demands for the devices such as detection accuracy and product cost have been increasingly diversified in recent years. Technical development has been done in a broad range of areas in response to these demands.

SUMMARY OF THE INVENTION

It is one object of the present invention to provide a rotation angle detection device with a totally novel configuration which detects a mechanical angle.

According to one aspect of the present invention, a rotation angle detection device includes: a first sensor which generates a first electrical signal according to a rotation angle of an object to be detected and whose shaft angle multiplier N is an integer, the shaft angle multiplier N representing that the electrical signal changes by N periods for one period of the rotation angle; a second sensor which generates a second electrical signal according to the rotation angle of the object to be detected and whose shaft angle multiplier n is an integer smaller than the shaft angle multiplier N of the first sensor; and an arithmetic unit that calculates the rotation angle from the first and second electrical signals, wherein, the arithmetic unit calculates a first calculated angle from the first electrical signal, and calculates from the second electrical signal a second calculated angle that corresponds one-to-one to the rotation angle in a range of 0° to 360° that is a full rotation of the object to be detected, and when a difference between the first calculated angle multiplied by n/N and the second calculated angle reaches a set value that is set based on a product of n/N and 360°, the arithmetic unit calculates a correction angle by making offset correction of adding an offset value corresponding to the set value to the first calculated angle multiplied by n/N, and calculates the rotation angle based on the correction angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a block diagram showing the configuration of an electric power steering system;

DETAILED DESCRIPTION OF EMBODIMENTS

Figure 2:
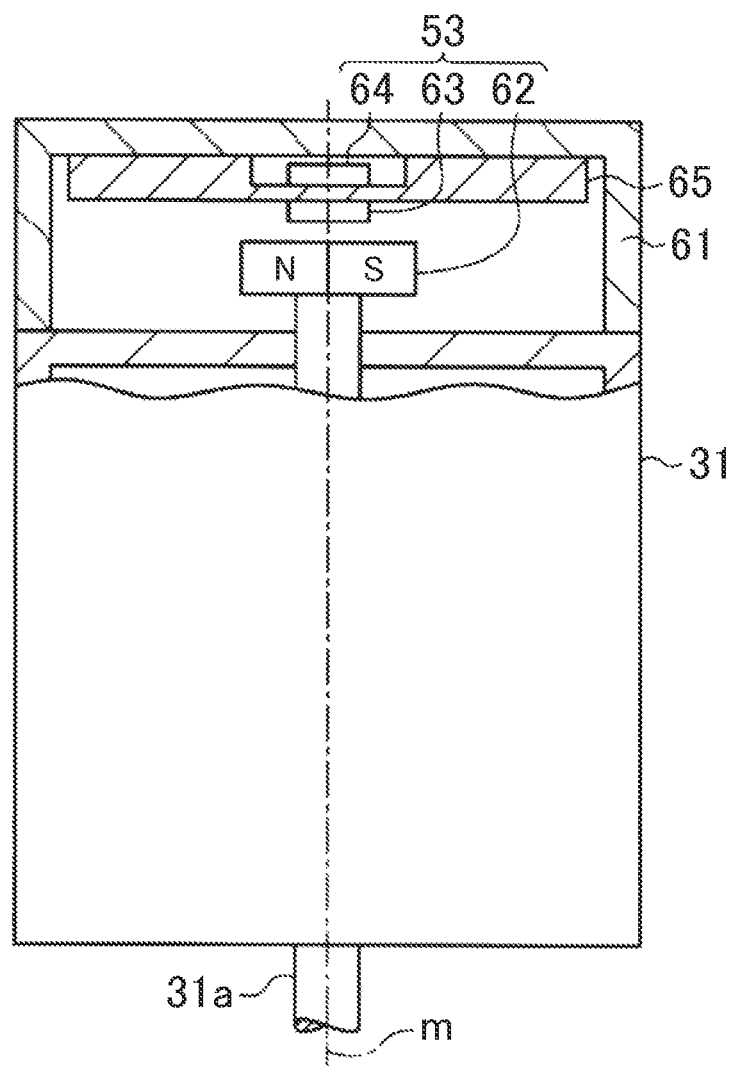
FIG. 2 is a sectional view showing a main part of a motor having a rotation angle sensor mounted thereon.

An electric power steering system for vehicles to which a rotation angle detection device of an embodiment of the present invention is applied will be described below. As shown in FIG. 1, an electric power steering system (EPS) 10 includes a steering mechanism 20, an assist mechanism 30, and an electronic control unit (ECU) 40. The steering mechanism 20 steers steered wheels 26 based on driver's operation of a steering wheel 21. The assist mechanism 30 assists driver's steering operation. The ECU 40 controls the assist mechanism 30.

The steering mechanism 20 includes the steering wheel 21 and a steering shaft 22 that rotates together with the steering wheel 21. The steering shaft 22 has a column shaft 22a coupled to the steering wheel 21, an intermediate shaft 22b coupled to the lower end of the column shaft 22a, and a pinion shaft 22c coupled to the lower end of the intermediate shaft 22b. The lower end of the pinion shaft 22c is coupled a rack shaft 23 (to be exact, rack teeth 23a) extending in a direction crossing the pinion shaft 22c. Rotary motion of the steering shaft 22 is therefore translated into reciprocating linear motion in the axial direction of the rack shaft 23 via a rack and pinion mechanism 24. This reciprocating linear motion is transmitted to the right and left steered wheels 26 through tie rods 25 coupled to both ends of the rack shaft 23, whereby the steered angle of the steered wheels 36 is changed.

The assist mechanism 30 includes a motor 31 as a source of an assist force. A three-phase alternating current (AC) motor such as a brushless motor is used as the motor 31. A rotary shaft 31a of the motor 31 is coupled to the column shaft 22a via a speed reduction mechanism 32. The speed reduction mechanism 32 reduces the speed of rotation output from the motor 31 and transmits the resultant rotational force to the column shaft 22a. That is, torque of the motor 31 is applied as an assist force to the steering shaft 22 to assist driver's steering operation. The motor 31 has three pole pairs in the present embodiment.

The ECU 40 controls the motor 31 based on the detection result of various sensors mounted on a vehicle. Examples of the various sensors include a vehicle speed sensor 51, a torque sensor 52, and a rotation angle sensor 53. The vehicle speed sensor 51 is mounted on the vehicle and detects the vehicle speed (traveling speed of the vehicle) V. The torque sensor 52 is mounted on the column shaft 22a and detects steering torque $\tau$ that is applied to the steering shaft 22 according to driver's steering operation. The rotation angle sensor 53 is mounted on the motor 31 and generates an electric signal according to the mechanical angle (motor rotation angle) $\theta$ as the rotation angle of the rotary shaft 31a of the motor 31. The ECU 40 detects the mechanical angle $\theta$ based on the electric signal generated by the rotation angle sensor 53. The ECU 40 calculates an assist force based on the vehicle speed V, the steering torque $\tau$, and the mechanical angle $\theta$ and controls the motor 31 so that the calculated assist force is applied.

The configuration of the rotation angle sensor will be described below. As shown in FIG. 2, for example, the rotation angle sensor 53 is mounted in a housing 61 attached to the end (upper part in FIG. 2) onspeed reduction mechanism the opposite side of the motor 31 from the speed reduction mechanism 32. The rotation angle sensor 53 has a bias magnet 62, an anisotropic magnetoresistive (AMR) sensor 63, and a giant magnetoresistive (GMR) sensor 64. The AMR sensor 63 and the GMR sensor 64 are examples of a magnetic sensor. The AMR sensor 63 has a shaft angle multiplier of 2×, and the GMR sensor 64 has a shaft angle multiplier of 1×. The bias magnet 62 is fixed to the end of the rotary shaft 31a. Accordingly, the bias magnet 62 also rotates when the rotary shaft 31a rotates. The AMR sensor 63 is mounted on a substrate 65 fixed to the bottom surface of the housing 61. The AMR sensor 63 faces the bias magnet 62 in the direction of an axis m of the rotary shaft 31a. The GMR sensor 64 is mounted on the surface on the opposite side of the substrate 65 from the AMR sensor 63. That is, the AMR sensor 63 and the GMR sensor 64 face each other with the substrate 65 interposed therebetween. The bias magnet 62, the AMR sensor 63, and the GMR sensor 64 are disposed on the axis m of the rotary shaft 31a.

Figure 3:
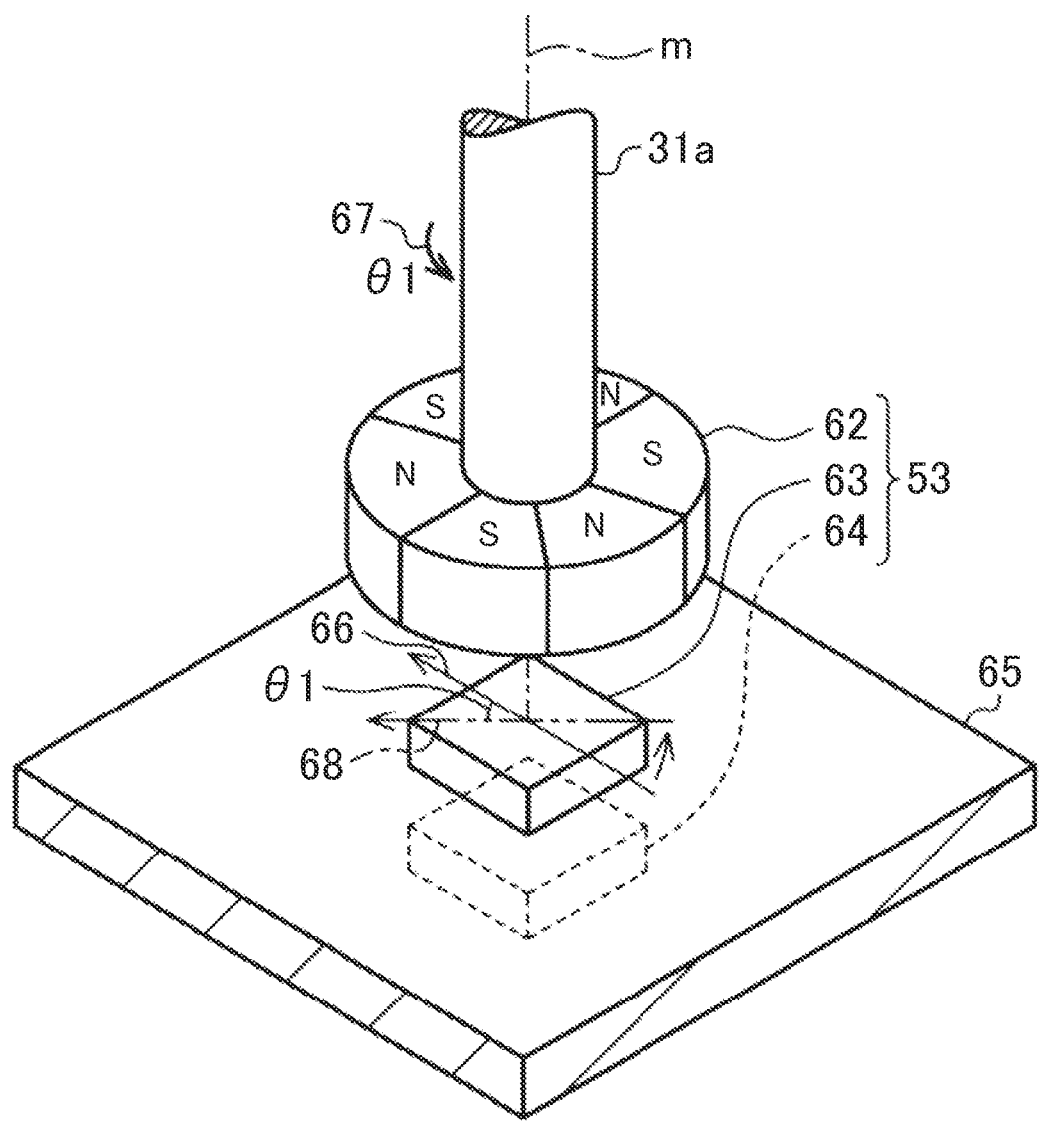
FIG. 3 is a perspective view of the rotation angle sensor.

As shown in FIG. 3, the bias magnet 62 is a columnar multipolar magnet in which N-poles and S-poles are alternately arranged in the circumferential direction. The number of pole pairs of the bias magnet 62 is the same as that of pole pairs of the motor 31. That is, the bias magnet 62 has three pole pairs. The bias magnet 62 thus has three pairs of N-pole and S-pole disposed in the circumferential direction so that the N-poles and the S-poles are alternately arranged. A bias magnetic field is applied to the AMR sensor 63 and the GMR sensor 64 by the bias magnet 62. For example, when the bias magnet 62 is in the state shown in FIG. 3, the bias magnetic field is applied to the AMR sensor 63 and the GMR sensor 64 in the direction shown by an arrow 66 (continuous line), namely the direction from the N-pole to the S-pole. When the rotary shaft 31a in this state is rotated by an angle $\theta 1$ in the direction shown by an arrow 67, the bias magnet 62 is also rotated by the angle $\theta 1$ in the direction shown by the arrow 67. The direction of the bias magnetic field that is applied to the AMR sensor 63 therefore changes from the direction shown by the arrow 66 (continuous line) to the direction shown by an arrow 68 (long dashed double-short dashed line), namely the direction rotated by the angle $\theta 1$ about the axis m from the direction shown by the arrow 66. The bias magnetic field that is applied to the GMR sensor 64 changes similarly to the bias magnetic field that is applied to the AMR sensor 63. The direction of the bias magnetic field that is applied to the AMR sensor 63 and the GMR sensor 64 thus changes according to the mechanical angle $\theta$ of the rotary shaft 31a.

The circuit configuration of the rotation angle sensor will be described in detail below.

Figure 4:
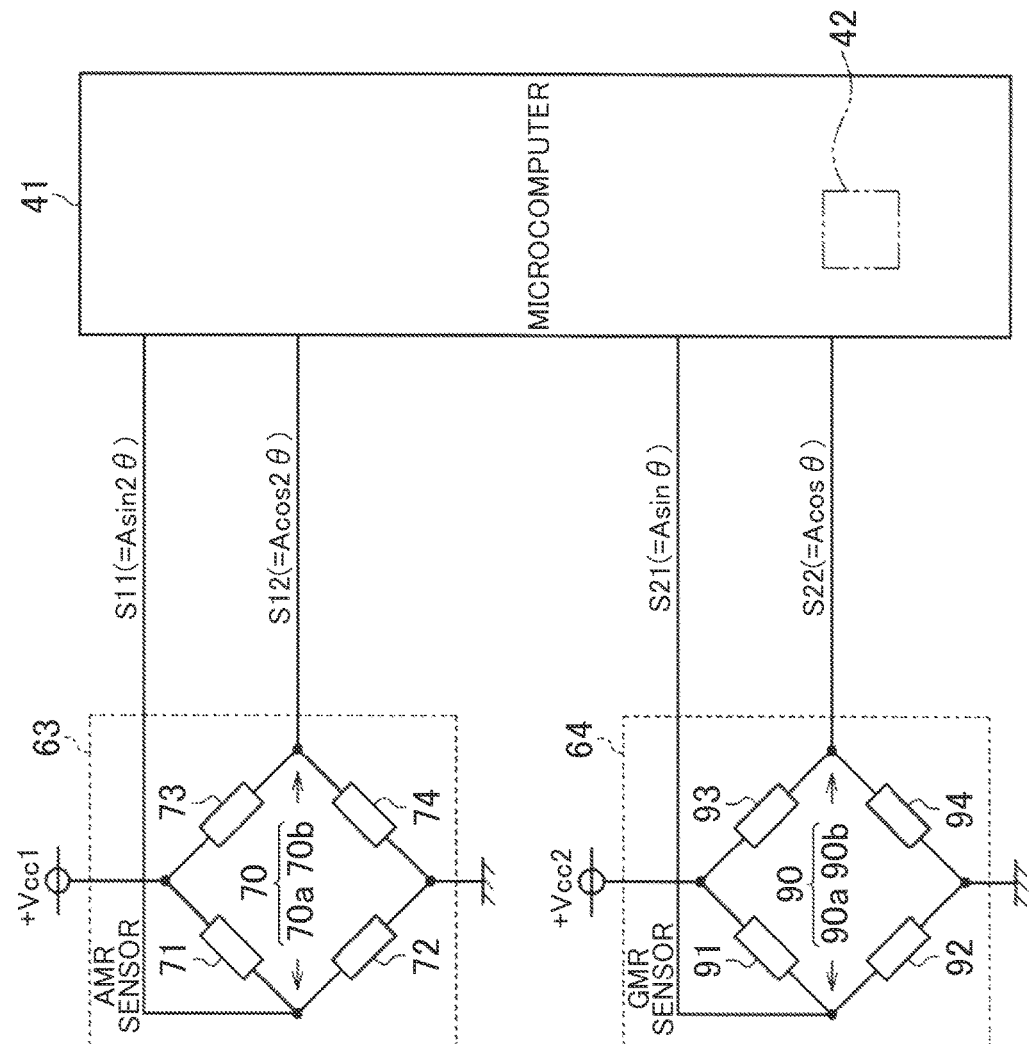
FIG. 4 is a circuit diagram showing the circuit configuration of magnetic sensors.

As shown in FIG. 4, the AMR sensor 63 generates first and second detection signals S11, S12 according to the direction of the bias magnetic field that is applied from the bias magnet 62. The AMR sensor 63 has a bridge circuit 70 formed by four AMR elements 71 to 74. The bridge circuit 70 has a half bridge circuit 70a formed by the two AMR elements 71, 72 and a half bridge circuit 70b formed by the remaining two AMR elements 73, 74. The two half bridge circuits 70a, 70b have their first ends connected to a power supply terminal (power supply voltage +Vcc1). The power supply voltage +Vcc1 is set to a voltage suitable for driving the AMR sensor 63. The two half bridge circuits 70a, 70b have their second ends grounded. The midpoint between the AMR elements 71, 72 of the half bridge circuit 70a is connected to a microcomputer 41 of the ECU 40, and a voltage at the midpoint is output as the detection signal S11 to the microcomputer 41. The midpoint between the AMR elements 73, 74 of the half bridge circuit 70b is connected to the microcomputer 41, and a voltage at the midpoint is output as the detection signal S12 to the microcomputer 41.

When the bias magnet 62 rotates together with the rotary shaft 31a, the direction of the bias magnetic field that is applied to the AMR elements 71 to 74 changes accordingly. The AMR elements are elements whose magnetic resistance value changes according to the direction of the bias magnetic field. The detection signals S11, S12 of the AMR sensor 63 therefore change according to rotation of the rotary shaft 31a. Every 180° rotation of the motor 31 (to be exact, the rotary shaft 31a) (every 180° change in mechanical angle) causes the electrical angle $\theta$ea of the detection signals S11, S12 to advance by one period. That is, the values of the detection signals S11, S12 of the AMR sensor 63 change according to the electrical angle $2\theta$ea twice the mechanical angle of the rotary shaft 31a.

The detection signals S11, S12 exhibiting the following behavior are obtained by adjusting arrangement of the AMR elements 71 to 74 with respect to the bias magnet 62. That is, the detection signal S11 is a sin signal with amplitude A which changes according to the electrical angle $2\theta$ea twice the mechanical angle, and the detection signal S12 is a cos signal with amplitude A whose phase is delayed by 90° with respect to the detection signal S11. The AMR elements 73, 74 are disposed so as to be shifted by a predetermined angle (45°) from the AMR elements 71, 72 in the rotation direction of the rotary shaft 31a. Since the AMR sensor 63 has a shaft angle multiplier of 2×, the detection signals S11, S12 for two periods are obtained while the bias magnet 62 makes a full rotation. That is, the values of the detection signals S11, S12 depend on the electrical angle 2θea twice the mechanical angle. The detection signals S11, S12 can be given by the following expressions (1), (2).

$$S11 = A \sin 2\theta ea \quad (1)$$

$$S12 = A \cos 2\theta ea \quad (2)$$

The GMR sensor 64 will be described below. The GMR sensor 64 generates detection signals S21, S22 according to the direction of the bias magnetic field that is applied from the bias magnet 62.

The GMR sensor 64 has a bridge circuit 90 formed by four GMR elements 91 to 94. The bridge circuit 90 has a half bridge circuit 90a formed by the two GMR elements 91, 92 and a half bridge circuit 90b formed by the remaining two GMR elements 93, 94. The two half bridge circuits 90a, 90b have their first ends connected to a power supply terminal (power supply voltage +Vcc2) and their second ends grounded. The power supply voltage +Vcc2 is set to a voltage suitable for driving the GMR sensor 64. A voltage at the midpoint of the half bridge circuit 90a is output as the detection signal S21 to the microcomputer 41. A voltage at the midpoint of the half bridge circuit 90b is output as the detection signal S22 to the microcomputer 41.

The GMR elements are elements whose magnetic resistance value changes according to the direction of the bias magnetic field. As in the AMR sensor 63, the resistance values of the GMR elements 91 to 94 therefore change according to a change in direction of the bias magnetic field which is caused by rotation of the rotary shaft 31a. The detection signals S21, S22 of the GMR sensor 64 change according to the mechanical angle θ of the motor 31.

The detection signals S21, S22 exhibiting the following behavior are obtained by adjusting arrangement of the GMR elements 91 to 94 with respect to the bias magnet 62. That is, the detection signal S21 is a sin signal with amplitude A which changes according to the electrical angle θeg, and the detection signal S22 is a cos signal with amplitude A whose phase is delayed by 90° with respect to the detection signal S21. Since the GMR sensor 64 has a shaft angle multiplier of 1×, the detection signals S21, S22 for one period are obtained while the bias magnet 62 makes a full rotation. That is, the values of the detection signals S21, S22 depend on the mechanical angle θ. The detection signals S21, S22 can be given by the following expressions (3), (4).

$$S21 = A \sin \theta eg \quad (3)$$

$$S22 = A \cos \theta eg \quad (4)$$

The microcomputer 41 receives the detection signals S11, S12, S21, S22 at predetermined timings. The microcomputer 41 calculates the electrical angle 2θea twice the mechanical angle by using the following expression (5). The microcomputer 41 calculates the electrical angle θeg by using the following expression (6). That is, the microcomputer 41 can calculate the electrical angle θea, θeg by calculating an arc tangent value from the detection signals S11, S12 or by calculating an arc tangent value from the detection signals S21, S22.

$$2\theta ea = \arctan(S11/S12) \quad (5)$$

$$\theta eg = \arctan(S21/S22) \quad (6)$$

The mechanical angle θ of the motor 31 and the electrical angle θs of the motor 31 are defined as follows. The mechanical angle θ changes by the same amount as the angle by which the rotary shaft 31a of the motor 31 rotates. The electrical angle θs is an angle corresponding to a change in bias magnetic field that changes when the rotary shaft 31a rotates. The electrical angle θs changes by the same number of periods as that of pole pairs Y of the bias magnet 62 while the mechanical angle θ changes by one period (while the rotary shaft 31a makes a full rotation). A change in bias magnetic field which is caused when the rotary shaft 31a rotates (electrical angle θ) affects the AMR sensor 63 and the GMR sensor 64. The AMR sensor 63 generates the detection signals S11, S12 according to the change in electrical angle θs. Similarly, the GMR sensor 64 generates the detection signals S21, S22 according to the change in electrical angle θs. The microcomputer 41 calculates the electrical angle θea of the detection signals S11, S12 and the electrical angle θeg of the detection signals S21, S22. The mechanical angle θ of the motor 31 is calculated by using the electrical angles θea, θeg.

The electrical angle θea of the detection signals S11, S12 and the electrical angle θeg of the detection signals S21, S22 do not necessarily match the mechanical angle θ. For example, the AMR sensor 63 having a shaft angle multiplier of 2× produces an output for two periods while the rotary shaft 31a makes a full rotation (0° to 360°). Accordingly, if the bias magnet 62 has an odd number Y of pole pairs, the AMR sensor 63 cannot completely generate the detection signals S11, S12 corresponding to the bias magnetic field. The calculated value of the electrical angle θea does not match the mechanical angle θ of the rotary shaft 31a. However, the GMR sensor 64 having a shaft angle multiplier of 1× produces an output for one period while the rotary shaft 31a makes a full rotation. The GMR sensor 64 can therefore completely generate the detection signals S21, S22 corresponding to the bias magnetic field regardless of whether the bias magnet 62 has an even number Y of pole pairs or an odd number Y of pole pairs. The value of the electrical angle θeg calculated based on the detection signals S21, S22 of the GMR sensor 64 therefore corresponds to the actual mechanical angle θ of the rotary shaft 31a.

In the case of a sensor having a shaft angle multiplier of 1×, the electrical angle of its output advances by one period. In the case where the number of pole pairs is Y, a bias magnetic field advances by Y periods while the motor 31 makes a full rotation. That is, the electrical angle θs of the motor 31 can be represented as a function that reaches 360° Y times while the motor 31 makes a full rotation or a 360° rotation.

In the case where one period of the bias magnetic field is represented as 360°, each of the electrical angles θea, θeg can be given by the product of the mechanical angle θ and the number Y of pole pairs. Since one period of the electrical angles θea, θeg is 360°, the electrical angles θea, θeg are the remainder of the division of the product of the mechanical angle θ and the number Y of pole pairs by 360°. The electrical angles θea, θeg can therefore be given by the following general expression (7). "REMAINDER" is a function representing only the remainder of the division.

$$\theta ea, \theta eg = \text{REMAINDER}(\theta \cdot Y/360) \quad (7)$$

Functions of the present embodiment will be described below.

The present embodiment uses the motor 31 having three pole pairs and the bias magnet 62 having three pole pairs. The bias magnetic field switches three times while the motor 31 makes a full rotation, namely by the time the mechanical angle θ changes from 0° to 360°. That is, as the bias magnet 62 is rotated, the direction of the bias magnetic field alternately changes three times like N-pole, S-pole, N-pole, and S-pole with respect to a specific reference direction.

Figure 5:
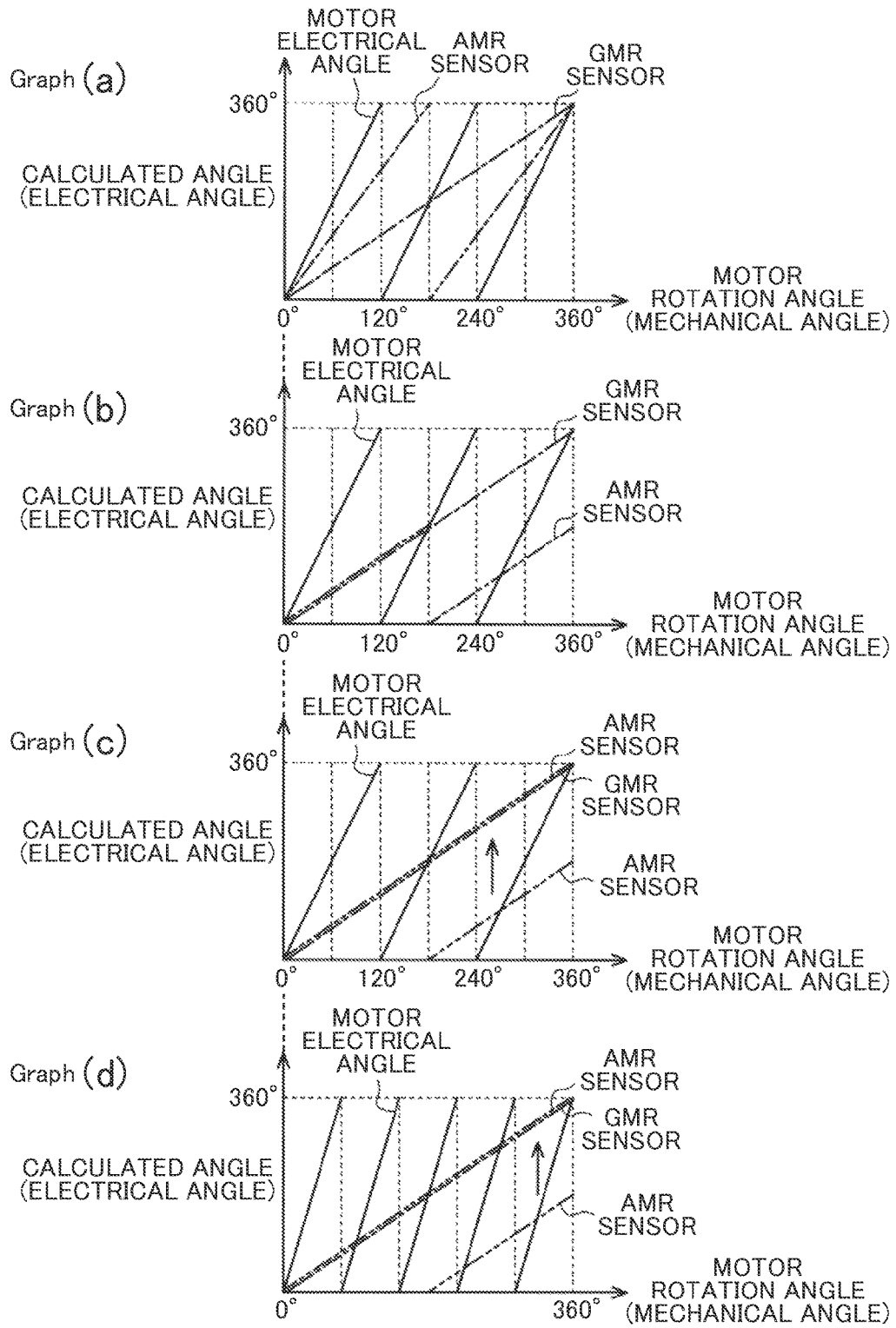
FIG. 5 shows in Graphs A to D the relationship between a mechanical angle and a calculated electrical angle in the case of using ideal sensor elements.

As shown by a continuous line in Graph A of FIG. 5, the electrical angle θs advances by three periods (changes from 0° to 360° three times) as the bias magnetic field switches three times. That is, one period of the electrical angle θs corresponds to the mechanical angle θ of 120°. Specifically, when the mechanical angle θ of the motor 31 is 0°, the electrical angle θs is also 0°. When the mechanical angle θ is 120° (the rotary shaft 31a has made ⅓ of a full rotation), the electrical angle θs is 360°. Similarly, when the mechanical angle θ changes from 120° to 240°, the electrical angle θs returns to 0° and changes to 360°. Similarly, when the mechanical angle θ changes from 240° to 360°, the electrical angle θs again changes from 0° to 360°.

As shown in Graph A of FIG. 5, if no output correction of the AMR sensor 63 is made, the electrical angle θea of the detection signals S11, S12 advances by two periods while the motor 31 makes a full rotation. That is, the electrical angle θea of the AMR sensor 63 changes from 0° to 360° while the mechanical angle θ changes from 0° to 180°. Similarly, the electrical angle θea of the AMR sensor 63 changes from 0° to 360° while the mechanical angle θ changes from 180° to 360°. The electrical angle θea is therefore a function that is discontinuous at the mechanical angle θ of 180°.

The electrical angle θeg of the detection signals S21, S22 that are generated by the GMR sensor 64 advances by one period while the motor 31 makes a full rotation. That is, the electrical angle θeg corresponds to the mechanical angle θ in the range of 0° to 360°. The mechanical angle θ in the range of 0° to 360° can therefore be calculated based on the electrical angle θeg.

The mechanical angle θ of the motor 31 having three pole pairs cannot be completely obtained by only the AMR sensor 63. The reason for this will be described in detail. For example, when the electrical angle θea of the AMR sensor 63 is 120°, there are two possible mechanical angles θ corresponding to the electrical angle θea of 120°, namely 60° and 240°. That is, the mechanical angle θ to be obtained is one of 60° and 240°, but which of the two mechanical angles θ is an actual mechanical angle θ cannot be decided by only the AMR sensor 63. On the other hand, when the electrical angle θeg of the GMR sensor 64 is 120°, it can be decided that the mechanical angle θ corresponding to the electrical angle θeg of 120° is 120°. The same applies to the other angles. The mechanical angle θ corresponding to a certain electrical angle θea cannot be completely uniquely decided by only the AMR sensor 63. The present embodiment therefore uses the GMR sensor 64 to assist detection of the mechanical angle θ by the AMR sensor 63 in order to achieve measurement of the mechanical angle θ that cannot be measured by only the AMR sensor 63. Specifically, the microcomputer 41 performs the following processing.

As shown in Graph B of FIG. 5, the electrical angle θea detected through the AMR sensor 63 is multiplied by ½ (the ratio of the shaft angle multiplier 1× of the GMR sensor 64 to the shaft angle multiplier 2× of the AMR sensor 63). The gradient of the output of the AMR sensor 63 is therefore ½ times the original gradient of the output of the AMR sensor 63. Ideally, the output of the AMR sensor 63 therefore matches the output of the GMR sensor 64 when the mechanical angle θ is in the range of 0° to 180°. When the mechanical angle θ is in the range of 180° to 360°, however, the output of the AMR sensor 63 and the output of the GMR sensor 64 are shifted from each other by a certain offset value in the direction of the ordinate and change parallel to each other. For example, the offset value is set to the value of the electrical angle θea of the AMR sensor 63 which corresponds to the mechanical angle θ of 180°.

As shown in Graph C of FIG. 5, in the range of the mechanical angle θ of 180° to 360° where the output of the AMR sensor 63 does not match the output of the GMR sensor 64, there is an offset difference of 180° between the electrical angle θea of the AMR sensor 63 and the electrical angle θeg of the GMR sensor 64. When there is the offset difference of 180° between the electrical angles θea, θeg, the offset value of 180° is added to the electrical angle θea. By adding the offset value in this region, the output of the AMR sensor 63 matches the output of GMR sensor 64, whereby correction of the AMR sensor 63 is completed. A corrected AMR angle θc obtained by correcting the electrical angle θea is given by the following expressions (8), (9) by using the electrical angle 2θea twice the mechanical angle as given by the expression (5).

$$\text{Corrected AMR angle } \theta c = 2\theta ea/2 (0° < \theta < 180°) \quad (8)$$

$$\text{Corrected AMR angle } \theta c = 2\theta ea/2 + 180° \\ (180° < \theta < 360°) \quad (9)$$

A calculated angle (calculated electrical angle) θo can be calculated by multiplying the corrected AMR angle θc thus calculated by the number Y of pole pairs. That is, the calculated angle θo is given by the following expression (10).

$$\text{Calculated angle } \theta o = \theta c \cdot Y \quad (10)$$

As also shown in Graph C of FIG. 5, the calculated angle θo corresponds one-to-one to the mechanical angle θ in the range of 0° to 360°. The mechanical angle θ can therefore be uniquely detected from the calculated angle θo in the range of 0° to 360°. For example, when the calculated angle θo is 60°, the mechanical angle θ can be calculated as 60°. When the calculated angle θo is 240°, the mechanical angle θ can be calculated as 240°.

Effects of the present embodiment will be described.

(1) The AMR sensor 63 has a shaft angle multiplier of 2×. Accordingly, in the case where the motor 31 has an even number of pole pairs, the mechanical angle θ can be completely by only the AMR sensor 63. In the case where the motor 31 has three pole pairs, however, the mechanical angle θ cannot be completely detected as the AMR sensor 63 has a shaft angle multiplier of 2×. The mechanical angle θ of the motor 31 having an odd number Y of pole pairs such as three, five, or seven pole pairs, which cannot be detected by only the AMR sensor 63, can be detected by combining the AMR sensor 63 having a shaft angle multiplier of 2× and the GMR sensor 64 having a shaft angle multiplier of 1×. The mechanical angle θ of the motor 31 having any number of pole pairs can thus be obtained. This is also advantageous in terms of cost because the mechanical angle θ can be detected by the more versatile combination of the AMR sensor 63 and the GMR sensor 64.

(2) In the case of combining sensors based on the same detection principles, similar abnormality may occur in the second sensor if abnormality occurs in the first sensor due to an abnormal bias magnetic field. The use of sensors based on different detection principles like the AMR sensor 63, the GMR sensor 64, etc. can reduce occurrence of similar abnormality in the second sensor even if abnormality occurs in the first sensor.

(3) The AMR sensor 63 is an inexpensive sensor with relatively high detection accuracy. However, the AMR sensor 63 cannot completely detect the mechanical angle θ of the motor 31 having an odd number Y of pole pairs. The GMR sensor 64 is an inexpensive sensor with lower detection accuracy than the AMR sensor 63. However, the GMR sensor 64 can detect the mechanical angle θ of the motor 31 having any number Y of pole pairs. Accordingly, the use of the AMR sensor 63 corrected by using the GMR sensor 64 can achieve complete detection of the mechanical angle θ and ensure relatively high detection accuracy at lower cost.

A second embodiment of the rotation angle detection device will be described. The difference from the first embodiment will be mainly described below.

Figure 6:
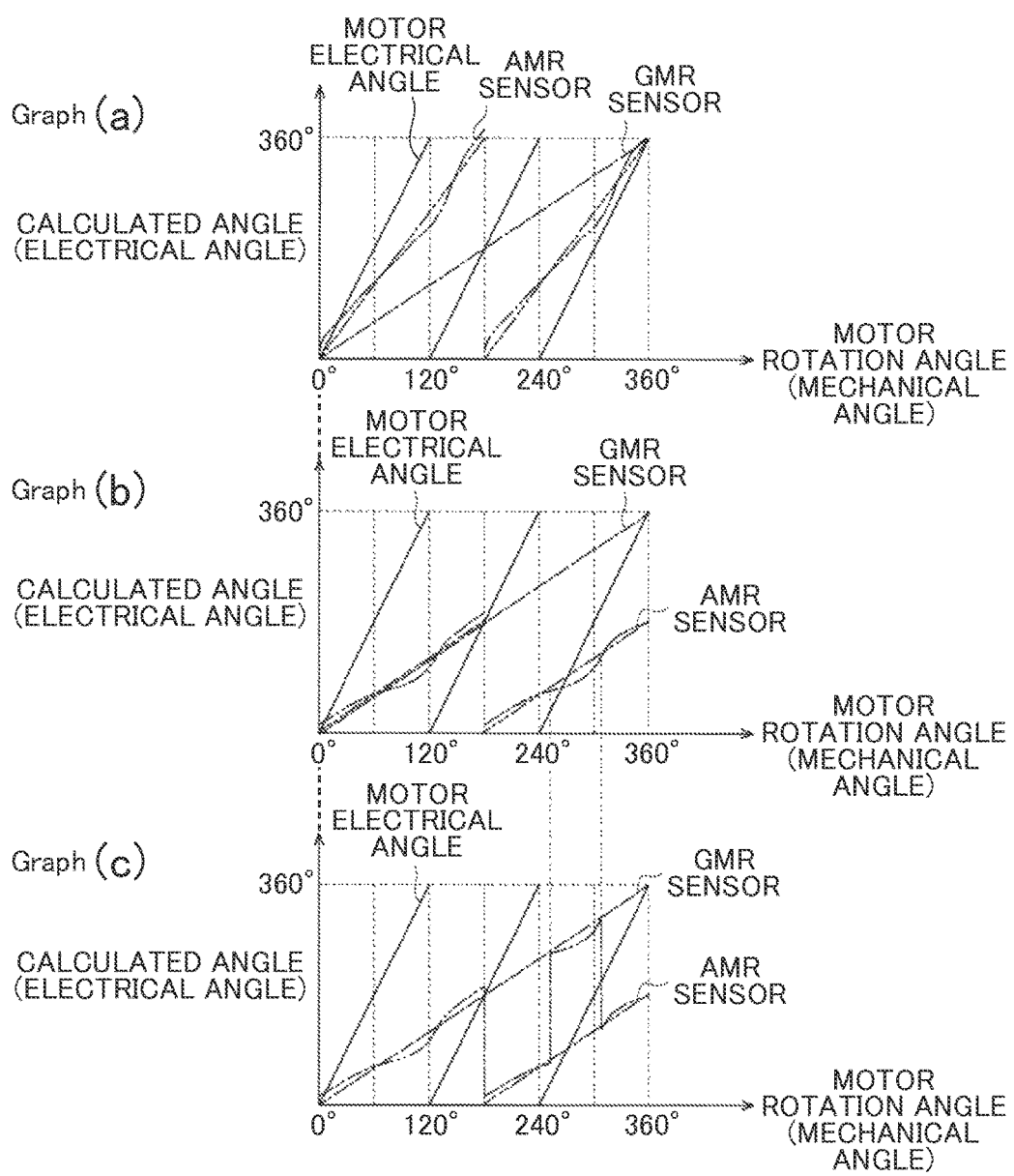
FIG. 6 shows in Graphs A to C the relationship between a mechanical angle and a calculated electrical angle in the case of using a sensor element having variation.

It is assumed in the rotation angle detection device of the first embodiment that the AMR sensor 63 and the GMR sensor 64 are ideal sensor elements. However, since the AMR sensor 63 and the GMR sensor 64 are actually formed of sensor elements with manufacturing variation, their detection signals have variation. Accordingly, the electrical angles θea, θeg that are calculated from the detection signals may also have variation. For example, the actual value of the electrical angle θea may vary as shown by long dashed double-short dashed lines in Graph A of FIG. 6. That is, the actual electrical angle θea may be partially larger or smaller than the ideal electrical angle θea (shown by long dashed triple-short dashed lines). It is assumed in Graph A of FIG. 6 that only the output of the AMR sensor 63 has variation and the output of the GMR sensor 64 does not have variation, namely the GMR sensor 64 is formed by an ideal sensor element, in order to simplify description of output correction of the AMR sensor 63.

The mechanical angle θ is detected as follows. As shown in Graph B of FIG. 6, the electrical angle θea of the detection signal S11 of the AMR sensor 63 is multiplied by ½ as in the first embodiment. When the mechanical angle θ is in the range of 0° to 180°, the electrical angle θea has slight variation, but has substantially the same values as the electrical angle θeg. However, when the mechanical angle θ is in the range of 180° to 360°, the difference between the electrical angles θea, θeg may not be 180° due to various factors.

If there is a difference of 180° between the electrical angle θea of the AMR sensor 63 and the electrical angle θeg of the GMR sensor 64, it is desired to add an offset value of 180° to the output of the AMR sensor 63 to make offset correction as in the first embodiment. However, since the output of the AMR sensor 63 has variation, the electrical angle θea corrected according to the mechanical angle θ as shown in Graph C of FIG. 6 cannot be obtained by merely making offset correction when there is a difference of 180° between the electrical angles θea, θeg. When the mechanical angle θ is in the range of 180° to 360°, offset correction is made if there is a difference of 180° between the electrical angles θea, θeg. Accordingly, offset correction is made if the electrical angle θea (long dashed double-short dashed line) of the AMR sensor 63 with variation is equal or smaller than the ideal electrical angle θea (long dashed triple-short dashed line) of the AMR sensor 63. However, for example, when the mechanical angle θ is in the range of 180° to 240°, the electrical angle θea (long dashed double-short dashed line) of the AMR sensor 63 with variation is larger than the ideal electrical angle θea (long dashed triple-short dashed line) of the AMR sensor 63. Accordingly, the difference between the electrical angles θea, θeg is not 180°, and no offset correction is made.

Accordingly, the corrected electrical angle θea of the AMR sensor 63 has discontinuity as offset correction is made in some parts but not in other parts.

In the case of an ideal sensor, offset correction need only be made only when there is a difference of 180° between the electrical angles θea, θeg. However, as shown in Graph B of FIG. 6, if the value of the electrical angle θea has variation, the difference between the electrical angle θea multiplied by ½ and the electrical angle θeg may not be 180° when the mechanical angle θ is, e.g., 180°. In this case, since the difference is smaller than 180°, correction of adding an offset value is not made. Accordingly, a correct mechanical angle θ cannot be obtained by the AMR sensor 63.

In the present embodiment, even if the difference between the electrical angle θea multiplied by ½ and the electrical angle θeg is not 180°, offset correction is made if certain conditions (e.g., the relationship with a certain threshold) are satisfied. That is, a certain threshold is set, and even if the absolute value of the difference between the electrical angles θea, θeg is not 180°, offset correction is made if the difference between the electrical angles θea, θeg is larger or smaller than the threshold. In this example, a lower limit threshold θt1 and an upper limit threshold θt2 are defined as the threshold. The lower limit threshold θt1 is set to an angle smaller than 180°, and the upper limit threshold θt2 is set to an angle larger than 180°. A corrected AMR angle θc that is the electrical angle θea after offset correction can be given by the following expressions (11), (12). Ideally, the corrected AMR angle θc substantially matches the electrical angle θeg.

Corrected AMR angle θc=2θea/2(|θea/2−θeg|<θt1, |θea/2−θeg|>θt2)  (11)

Corrected AMR angle θc=2θea/2+180°(θt1≤|θea/2−θeg|≤θt2)  (12)

Figure 7:
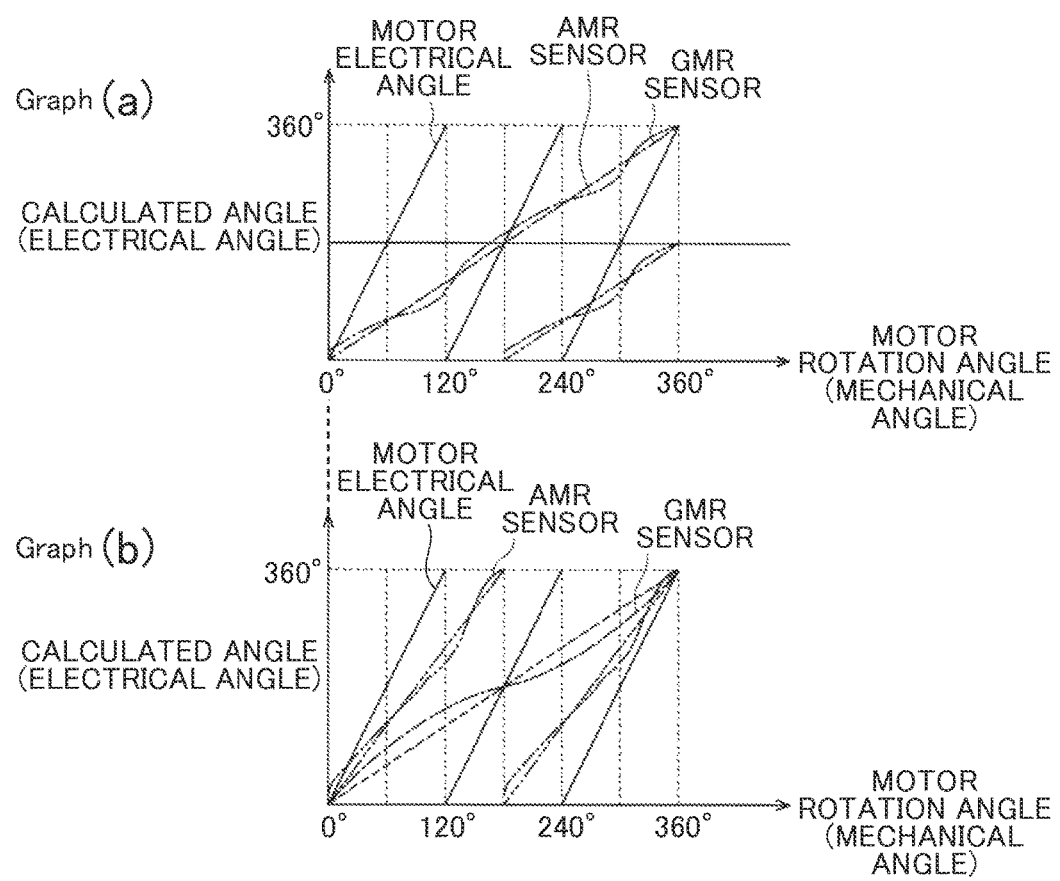
FIG. 7 shows in Graphs A, B the relationship between a mechanical angle and a calculated electrical angle in the case of using a sensor element having variation.

Offset correction is made when the difference between the electrical angle θea multiplied by ½ and the electrical angle θeg is smaller than the upper limit threshold θt2 or larger than the lower limit threshold θt1. For example, the lower limit threshold θt1 and the upper limit threshold θt2 are decided in view of variation that can be expected from design such as variation of the resistance value of the sensor element and manufacturing variation of the sensor element. Offset correction can be reliably made as shown in Graph A of FIG. 7 by taking such variation into consideration. Since the output of the AMR sensor 63 can be corrected, the mechanical angle θ can be detected based on the electrical angle θea of the AMR sensor 63.

Effects of the present embodiment will be described.

(1) In the present embodiment, even if the output of the sensor element has variation, offset correction of the output (detection signals S11, S12) of the AMR sensor 63 can be more reliably made by setting the lower limit threshold θt1 and the upper limit threshold θt2. A band-like region is defined for the electrical angle θeg of the GMR sensor 64 based on the range that can be expected from design, and the difference between the electrical angle θeg of the output of the GMR sensor 64 and the electrical angle θea of the output of the AMR sensor 63 multiplied by ½ is obtained in this region. Since the offset correction of the AMR sensor 63 is made more reliably, more reliable detection of the mechanical angle θ by the AMR sensor 63 can be achieved.

A third embodiment of the rotation angle detection device will be described. The difference from the first embodiment will be mainly described below. If the GMR sensor 64 breaks down, the output of the AMR sensor 63 cannot be corrected by the output of the GMR sensor 64, and the mechanical angle θ cannot be obtained. In the present embodiment, backup control is performed if the GMR sensor 64 breaks down during steering. In the backup control, the mechanical angle θ is detected by only the AMR sensor 63.

The microcomputer 41 includes a counter 42 (see FIG. 4). If it is determined from the output of the GMR sensor 64 that it is time to make offset correction, the microcomputer 41 sets a counter value of the counter 42 to 1. If it is determined from the output of the GMR sensor 64 that it is not time to make offset correction, the microcomputer 41 sets the counter value of the counter 42 to 0.

Figure 8:
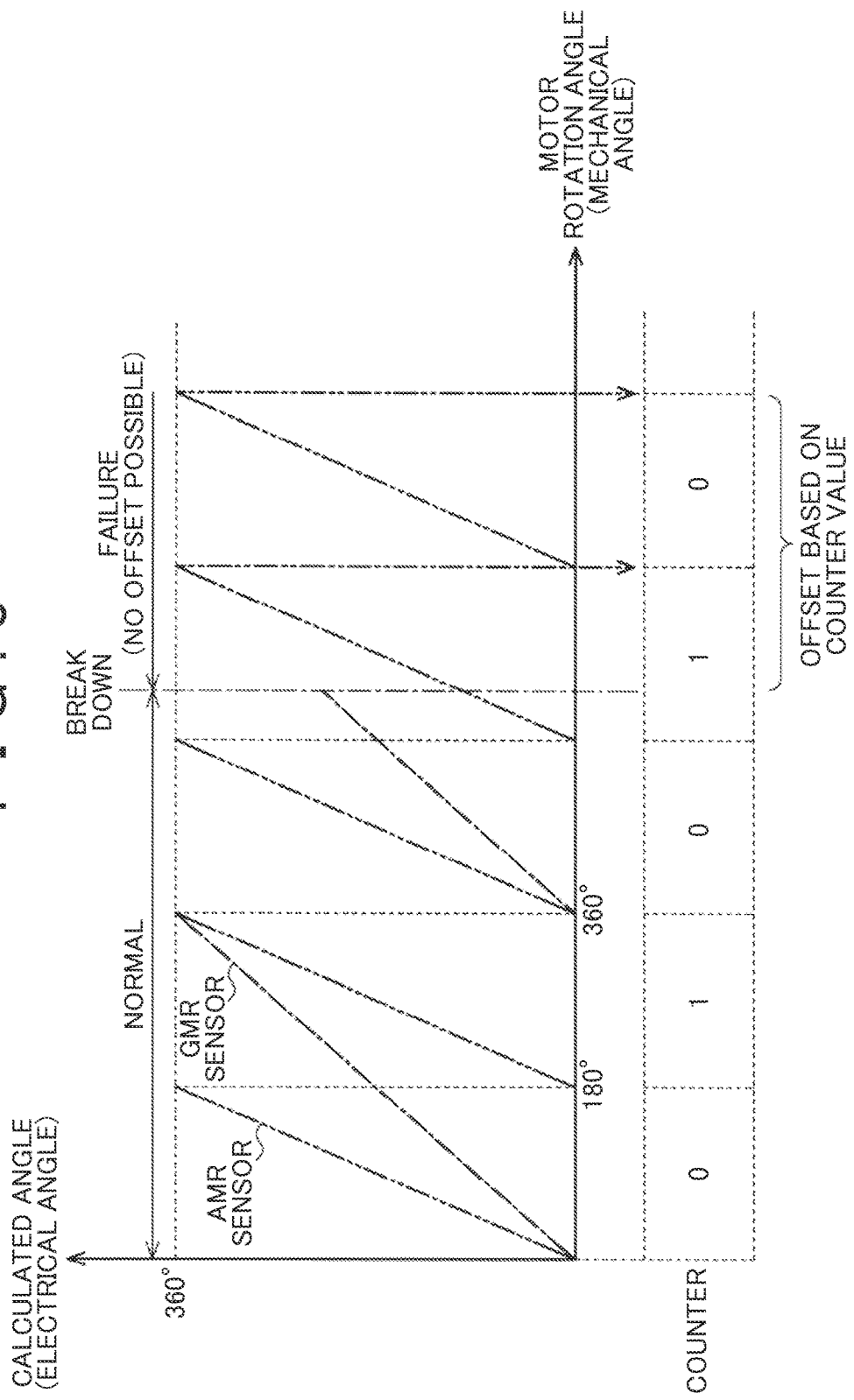
FIG. 8 is a graph showing the relationship among a mechanical angle, a calculated electrical angle, and a counter value in the case of performing backup control.

Normally, the AMR sensor 63 and the GMR sensor 64 are driven when IG is on (an ignition switch is turned on), whereby the mechanical angle θ at that time can be calculated. This mechanical angle θ is calculated by making offset correction of the output of the AMR sensor 63 by the output of GMR sensor 64 as in the first embodiment. Normally, the counter value of the counter 42 is set to 0 when the mechanical angle θ is in the range of 0° to 180°, and is set to 1 when the mechanical angle θ is in the range of 180° to 360°, as shown in FIG. 8.

If the GMR sensor 64 can no longer output the detection signals S21, S22 due to failure etc., the microcomputer 41 makes offset correction of the output of the AMR sensor 63 by using the counter value that is normally stored in the counter 42. For example, the counter value at the time the GMR sensor 64 breaks down is 1 as shown in FIG. 8. Since the counter value of 1 is a counter value to be recorded at the timing of making offset correction, it can be determined that now is the timing to make offset correction. The mechanical angle θ is thus calculated by making offset correction of the output value of the AMR sensor 63. Subsequently, the counter value of 0 is recorded in the counter 42 when the electrical angle θea of the AMR sensor 63 exceeds 360°. Accordingly, offset correction is not made when the subsequent electrical angle θea is in the region of 0° to 360°. When this electrical angle θea exceeds 360°, the counter value of 1 is recorded in the counter 42. Since the counter value is 1, offset correction of the output of the AMR sensor 63 is made. A process similar to that described above is performed thereafter. The mechanical angle θ can thus be detected even if the output of the GMR sensor 64 cannot be obtained.

In this offset correction, the counter value need be normally recorded in the counter 42 by the output of the GMR sensor 64. It appears that the rotation angle sensor 53 including the counter 42 could completely obtain the mechanical angle θ by making offset correction of the output of the AMR sensor 63, even if the GMR sensor 64 is not provided. However, before the counter value is able to be recorded in the counter 42, the mechanical angle θ need be detected by driving the GMR sensor 64 at least once. Accordingly, even the rotation angle sensor 53 including the counter 42 cannot obtain the mechanical angle θ by making offset correction of the output of the AMR sensor 63, unless the GMR sensor 64 is provided. For example, in order to make offset correction of the output of the AMR sensor 63 without providing the GMR sensor 64, the counter value need be recorded in the counter 42 at the factory. If the GMR sensor 64 breaks down while the IG is off, the counter 42 cannot monitor that the rotary shaft 31a of the motor 31 has rotated, when the IG is turned on again. Even when the GMR sensor 64 breaks down while the IG is on, the counter 42 cannot monitor that the rotary shaft 31a of the motor 31 has rotated, when the IG is turned on again after being turned off. This is because, while the IG is off, the microcomputer 41 is stopped and therefore the counter 42 is not driven. In this case, offset correction is stopped until the GMR sensor 64 is repaired, so as not to allow the microcomputer 41 to control the motor 31 by a wrong assist force.

When the AMR sensor 63 breaks down, detection accuracy (dynamic range) of the rotation angle sensor 53 decreases, but the mechanical angle θ is detected based on the output of the GMR sensor 64.

Effects of the present embodiment will be described.

(1) Even if the GMR sensor 64 breaks down during offset correction of the electrical angle θea of the AMR sensor 63 by the electrical angle θeg of the GMR sensor 64, offset correction of the electrical angle θea of the AMR sensor 63 can be made by using the counter value of the counter 42. Detection of the mechanical angle θ can therefore be continued.

A fourth embodiment of the rotation angle detection device will be described. The difference form the first embodiment will be mainly described below. The AMR sensor 63 and the GMR sensor 64 of the fourth embodiment are redundant. The rotation angle detection device has a function to detect abnormality of the sensor output in addition to the function to detect the mechanical angle θ.

The AMR sensor 63 includes a bridge circuit 80 in addition to the bridge circuit 70. The bridge circuit 80 has a configuration similar to that of the bridge circuit 70, and is disposed so as to be shifted by a predetermined angle in the rotation direction of the rotary shaft 31a with respect to the bridge circuit 70. The bridge circuit 80 has AMR elements 81 to 84. The bridge circuit 80 has a half bridge circuit 80a formed by the two AMR elements 81, 82 and a half bridge circuit 80b formed by the remaining two AMR elements 83, 84. The two half bridge circuits 80a, 80b have their first ends connected to a power supply terminal (power supply voltage +Vcc1) and their second ends grounded. A voltage at the midpoint between the AMR elements 81, 82 of the half bridge circuit 80a is output as a detection signal S13 to the microcomputer 41. Similarly, a voltage at the midpoint between the AMR elements 83, 84 of the half bridge circuit 80b is output as a detection signal S14 to the microcomputer 41.

The GMR sensor 64 includes a bridge circuit 100 in addition to the bridge circuit 90. The bridge circuit 100 has substantially the same configuration as the bridge circuit 90. The bridge circuit 100 has a half bridge circuit 100a formed of GMR elements 101, 102 and a half bridge circuit 100b formed of GMR elements 103, 104. A voltage at the midpoint between the GMR elements 101, 102 is output as a detection signal S23 to the microcomputer 41, and a voltage at the midpoint between the GMR elements 103, 104 is output as a detection signal S24 to the microcomputer 41.

When the bias magnet 62 rotates together with the rotary shaft 31a, the direction of the bias magnetic field that is applied to the AMR elements 71 to 74, 81 to 84 and the GMR elements 91 to 94, 101 to 104 changes accordingly and the magnetic resistance value of each element therefore changes accordingly. The values of the detection signals S11 to S14, S21 to S24 change according to the change in magnetic resistance value of the AMR elements 71 to 74, 81 to 84 and the GMR elements 91 to 94, 101 to 104. The detection signals S11 to S14 change according to the electrical angle 2θea twice the mechanical angle of the rotary shaft 31a. The detection signals S21 to S24 change according to the electrical angle θeg of the rotary shaft 31a.

The detection signals S11 to S14 exhibiting the following behavior are obtained by adjusting arrangement of the AMR elements 71 to 74, 81 to 84 with respect to the bias magnet 62. That is, the detection signal S11 is a sin signal with amplitude A which changes according to the electrical angle 2θea twice the mechanical angle. The detection signal S12 is a cos signal with amplitude A whose phase is delayed by 90° with respect to the detection signal S11. The detection signal S13 is a −sin signal with amplitude A whose phase is shifted by 180° with respect to the detection signal S11. The detection signal S14 is a −cos signal with amplitude A whose phase is shifted by 180° with respect to the detection signal S12. Accordingly, the detection signals S11, S12 can be given by the above expressions (1), (2), and the detection signals S13, S14 can be given by the following expressions (13), (14).

$$S13 = -A \sin 2\theta ea \quad (13)$$

$$S14 = -A \cos 2\theta ea \quad (14)$$

The detection signals S21 to S24 exhibiting the following behavior are obtained by adjusting arrangement of the GMR elements 91 to 94, 101 to 104 with respect to the bias magnet 62. That is, the detection signal S21 is a sin signal with amplitude A which changes according to the electrical angle 2θea twice the mechanical angle. The detection signal S22 is a cos signal with amplitude A whose phase is delayed by 90° with respect to the detection signal S21. The detection signal S23 a −sin signal with amplitude A whose phase is shifted by 180° with respect to the detection signal S21. The detection signal S24 is a −cos signal with amplitude A whose phase is shifted by 180° with respect to the detection signal S22. Accordingly, the detection signals S21, S22 can be given by the above expressions (3), (4), and the detection signals S23, S24 can be given by the following expressions (15), (16).

$$S23 = -A \sin \theta eg \quad (15)$$

$$S24 = -A \cos \theta eg \quad (16)$$

The microcomputer 41 receives the detection signals S11 to S14, S21 to S24 at predetermined timings. The microcomputer 41 calculates the difference between the detection signals S11, S13, the difference between the detection signals S12, S14, the difference between the detection signals S21, S23, and the difference between the detection signals S22, S24 as given by the following expressions (17) to (20). These differences are signals whose amplitude is twice that of the detection signals S11 to S14, S21 to S24. The microcomputer 41 can calculate the mechanical angle θ by calculating an arc tangent value based on two of the above difference values as given by the following expressions (21), (22).

$$\text{Difference value between sine components of the AMR sensor } 63 = S11 - S13 = 2A \sin 2\theta ea \quad (17)$$

$$\text{Difference value between cosine components of the AMR sensor } 63 = S12 - S14 = 2A \cos 2\theta ea \quad (18)$$

$$\text{Difference value between sine components of the GMR sensor } 64 = S21 - S23 = 2A \sin \theta eg \quad (19)$$

$$\text{Difference value between cosine components of the GMR sensor } 64 = S22 - S24 = 2A \cos \theta eg \quad (20)$$

$$2\theta ea = \arctan(2A \sin 2\theta ea / 2A \cos 2\theta ea) \quad (21)$$

$$\theta eg = \arctan(2A \sin \theta eg / 2A \cos \theta eg) \quad (22)$$

The microcomputer 41 can calculate the electrical angle 2θea twice the mechanical angle based on the output of the AMR sensor 63 by using the following expressions (23), (24). The microcomputer 41 can calculate the electrical angle θeg based on the output of the GMR sensor 64 by using the following expressions (25), (26). That is, the microcomputer 41 can calculate the electrical angles θea, θeg by calculating the arc tangent values from the detection signals S11 to S14, S21 to S24.

$$2\theta ea = \arctan(S11/S12) \quad (23)$$

$$2\theta ea = \arctan(S13/S14) \quad (24)$$

$$\theta eg = \arctan(S21/S22) \quad (25)$$

$$\theta eg = \arctan(S23/S24) \quad (26)$$

The microcomputer 41 thus has a function to detect abnormality of the detection signals S11 to S14, S21 to S24 in addition to the function to detect the electrical angle 2θea twice the mechanical angle and the electrical angle θeg from the detection signals S11 to S14, S21 to S24.

Figure 9:
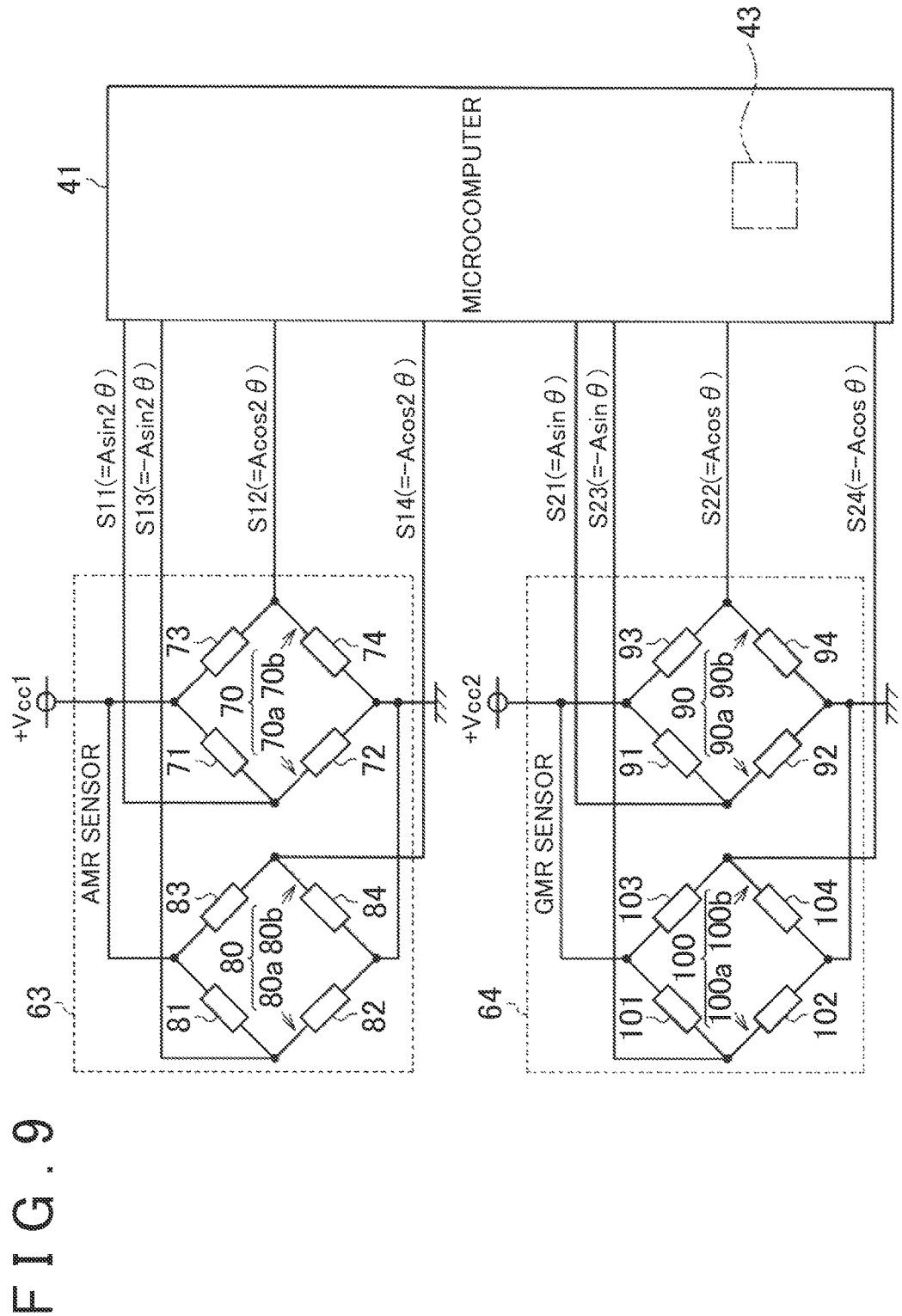
FIG. 9 is a circuit diagram showing the circuit configuration of magnetic sensors.

As shown in FIG. 9, the microcomputer 41 has an abnormality detection circuit 43. The abnormality detection circuit 43 detects abnormality by a three-signal abnormality detection method using characteristics of the electrical angle 2θea twice the mechanical angle and the electrical angle θeg, in addition to detecting abnormality by the sum of the detection signals S11 to S14, S21 to S24. The abnormality detection circuit 43 normally detects abnormality by the sum of the detection signals. If a certain detection signal cannot be correctly detected due to failure of the sensor element etc., the abnormality detection circuit 43 cannot detect abnormality of the detection signal to be paired with this detection signal by the sum of the detection signals. If the abnormality detection circuit 43 cannot detect abnormality by the sum of the detection signals, it detects abnormality by using three signals, namely the detection signal for which abnormality is to be detected and two other detection signals.

First, the abnormality detection method using the sum of the detection signals will be described in detail below. The detection signals S11, S13 have a phase difference of 180° from each other, and the detection signals S12, S14 have a phase difference of 180° from each other. Similarly, the detection signals S21, S23 have a phase difference of 180° from each other, and the detection signals S22, S24 have a phase difference of 180° from each other.

Accordingly, the following expressions (27) to (30) are theoretically satisfied.

$$S11 + S13 = 0 \quad (27)$$

$$S12 + S14 = 0 \quad (28)$$

$$S21 + S23 = 0 \quad (29)$$

$$S22 + S24 = 0 \quad (30)$$

If the expression (27) is not satisfied, it can be detected that the detection signal S11 or the detection signal S13 is abnormal. If the expression (28) is not satisfied, it can be detected that the detection signal S12 or the detection signal S14 is abnormal. Similarly, if the expression (29) is not satisfied, it can be detected that the detection signal S21 or the detection signal S23 is abnormal. If the expression (30) is not satisfied, it can be detected that the detection signal S22 or the detection signal S24 is abnormal.

Each of the AMR elements 71 to 74, 81 to 84 and the GMR elements 91 to 94, 101 to 104 actually has a deviation or variation specific to each element. An acceptable range based on zero is therefore set in view of the deviation that can be expected from design. If a deviation larger than this acceptable range is detected, the abnormality detection circuit 43 determines that the corresponding detection signal is abnormal.

The following method may be used as an abnormality detection method using the sum of detection signals. The abnormality detection circuit 43 may determine whether the detection signal is abnormal or not based on whether the absolute value of a deviation of the sum of the detection signals is larger than a certain threshold or not. In this case, the expressions (27) to (30) are changed to expressions (27a) to (30a).

$$|S11+S13|>\text{threshold} \tag{27a}$$

$$|S12+S14|>\text{threshold} \tag{28a}$$

$$|S21+S23|>\text{threshold} \tag{29a}$$

$$|S22+S24|>\text{threshold} \tag{30a}$$

If the absolute value of the deviation is larger than the certain threshold, the abnormality detection circuit 43 determines that the detection signal corresponding to the expression is abnormal. If the absolute value of the deviation is not larger than the certain threshold, the abnormality detection circuit 43 determines that the corresponding detection signal S11 to S14, S21 to S24 is normal. The microcomputer 41 can calculate the mechanical angle θ by using the normal detection signals S11 to S14, S21 to S24.

If abnormality is detected by using the sum of the detection signals, the abnormality detection circuit 43 detects abnormality by the three-signal abnormality detection method. There are six possible abnormality patterns in the case where the four detection signals S11 to S14 and the four detection signals S21 to S24 are obtained from the AMR sensor 63 and the GMR sensor 64 as in the present embodiment.

Patterns P1 to P4 are the cases where one of the bridge circuits 70, 80, 90, 100 is abnormal. For example, abnormality is detected in only one of the detection signals due to failure of only a sensor element, or system abnormality is detected due to failure of a certain bridge circuit (e.g., both of the detection signals S11, S12 are abnormal due to failure of the bridge circuit 70). A common cause is wiring abnormality of a ground terminal or the power supply terminal for driving each sensor element.

Patterns P5, P6 are the cases where all of the four detection signals from the AMR sensor 63 or the GMR sensor 64 are abnormal due to failure of the AMR elements 71 to 74, 81 to 84 or the GMR elements 91 to 94, 101 to 104. For example, in this case, a normal detection signal cannot be output because the power supply terminal or the ground terminal is abnormal or due to a surge from each terminal.

The abnormality detection method for each pattern will be described in detail below.

The pattern P1 is the case where the bridge circuit 70 is abnormal. In this case, at least one of the detection signals S11, S12 is abnormal. For example, at least one of the detection signals S11, S12 is not output due to failure of the bridge circuit 70, or the power supply voltage +Vcc1 is not applied to the bridge circuit 70 due to an abnormal wiring between the bridge circuit 70 and the power supply terminal. In this case, abnormality of the detection signals S11, S12 cannot be detected even if the detection signals S13, S14 of the AMR sensor 63, which appear to be normal, are applied to, e.g., the expressions (27a), (28a). Since at least one of the detection signals S11, S12 is abnormal, it is not guaranteed that the detection signals S13, S14 are normal even if the sum of the detection signals S11, S13 and the sum of the detection signals S12, S14 are smaller than their thresholds. For example, in the case where the detection signal S11 is abnormal and therefore the detection signal S11 having a value that is about twice its normal value is output, the detection signal S13 may also be abnormal and the detection signal S13 having a value that is about twice its normal value may be output. In this case, the sum of the detection signals S11, S13 obtained by the expression (27a) may be smaller than the threshold. Accordingly, in the abnormality detection method using the sum of the detection signals, it is determined that the detection signals S11, S13 are normal, although the detection signals S11, S13 have abnormal values.

In the present embodiment, abnormality of the sensor element is detected by the three-signal abnormality detection method.

In the case of the pattern P1, whether the detection signals S13, S14 are abnormal or not is detected. The three-signal abnormality detection method is an abnormality detection method using an addition theorem. There is the relationship of an addition theorem between a double angle and a half angle. Accordingly, there is no relationship of an addition theorem, it is determined that abnormality has occurred. That is, it can be determined that abnormality has occurred by using the detection signals S21 to S24 of the GMR sensor 64 and the detection signals S11 to S14 from the AMR sensor 63 as the double angles of the detection signals S21 to S24. This can be given by the following expressions (31) to (34). The reason why the threshold is on the right side of each of the expressions (31) to (34) is the same as that in the case of the expressions (27a) to (30a).

$$|S11-(2S21\cdot S22)|>\text{threshold} \tag{31}$$

$$|S12-(S22^2-S21^2)|>\text{threshold} \tag{32}$$

$$|S13-(2S23\cdot S24)|>\text{threshold} \tag{33}$$

$$|S14-(S24^2-S23^2)|>\text{threshold} \tag{34}$$

In the case of the pattern P1, at least one of the detection signals S11, S12 has an abnormal value due to abnormality of the bridge circuit 70. It is therefore desired to detect whether the detection signals S13, S14, S21 to S24 that are output from the other bridge circuits 80, 90, 100 are abnormal or not without using the detection signals S11, S12. In this case, the use of the expressions (33), (34) makes it possible to detect whether the detection signals S13, S14 are abnormal or not without using the detection signals S11, S12.

The expression (33) is used to determine whether the detection signal S13 is abnormal or not. If the absolute value of the difference between the detection signal S13 of the AMR sensor 63 and twice the product of the detection signals S23, S24 of the GMR sensor 64 is larger than the threshold, the abnormality detection circuit 43 determines that the detection signal S13 is abnormal. If this absolute value is equal to or smaller than the threshold, the abnormality detection circuit 43 determines that the detection signal S13 is normal. The expression (34) is used to determine whether the detection signal S14 is abnormal or not. If the absolute value of the difference between the detection signal S14 of the AMR sensor 63 and the difference between the square of the detection signal S23 and the square of the detection signal S24 of the GMR sensor 64 is larger than the threshold, the abnormality detection circuit 43 determines that the detection signal S14 is abnormal. If this absolute value is equal to or smaller than the threshold, the abnormality detection circuit 43 determines that the detection signal S14 is normal. If it is determined that the detection signals S13, S14 are normal, the electrical angle θea is detected by using the detection signals S13, S14.

Whether the detection signals S21 to S24 of the GMR sensor 64 are abnormal or not can be determined as usual based on the sum of the detection signals as given by the expressions (29a), (30a).

The pattern P2 will be described below. The pattern P2 is the case where the bridge circuit 80 of the AMR sensor 63 is abnormal. In this case, since at least one of the detection signals S13, S14 is abnormal, it is desired to detect whether the detection signals S11, S12 of the bridge circuit 70 are abnormal or not without using the detection signals S13, S14. In the pattern P2, whether the detection signals S11, S12 of the bridge circuit 70 are abnormal or not can be detected by a process substantially similar to that for the pattern P1. The expression (31) is used to determine whether the detection signal S11 is abnormal or not. Similarly, the expression (32) is used to determine whether the detection signal S12 is abnormal or not. If it is determined that the detection signals S11, S12 are normal, the detection signals S11, S12 are used as information for obtaining the electrical angle θea.

Whether the detection signals S21 to S24 of the GMR sensor 64 are abnormal or not can be determined as usual based on the sum of the detection signals as given by the expressions (29a), (30a).

The pattern P3 will be described below. The pattern P3 is the case where the bridge circuit 90 of the GMR sensor 64 is abnormal. In this case, since at least one of the detection signals S21, S22 is abnormal, it is desired to detect whether the detection signals S23, S24 of the bridge circuit 100 are abnormal or not without using the detection signal S21 or S22.

In this case, whether the detection signals S23, S24 of the bridge circuit 100 are abnormal or not can be detected by using the expressions (33), (34). If each of the left sides of the expressions (33), (34) is equal to or smaller than the threshold, it can be determined that both of the detection signals S23, S24 are normal.

The GMR sensor 64 is provided in order to obtain information for correcting the detection signals S11 to S14 from the AMR sensor 63. Detection accuracy of the GMR sensor 64 need not be as high as that of the AMR sensor 63, and whether the detection signals S21 to S24 of the GMR sensor 64 are abnormal or not need not be determined as long as the difference between the output of the AMR sensor 63 and the output of the GMR sensor 64 is equal to or smaller than a threshold range that is set according to whether the output of the AMR sensor 63 can be corrected or not.

Whether the detection signals S11 to S14 of the AMR sensor 63 are abnormal or not can be determined as usual based on the sum of the detection signals as given by the expressions (27a), (28a).

The pattern P4 will be described below. The pattern P4 is the case where the bridge circuit 100 of the GMR sensor 64 is abnormal. A process similar to that for the pattern P3 is performed in the case of the pattern P4. In the pattern P4, since the bridge circuit 100 is abnormal, it is desired to detect whether the detection signals S21, S22 of the bridge circuit 90 are abnormal or not without using the detection signals S23, S24. In this case, whether the detection signals S21, S22 of the bridge circuit 90 are abnormal or not can be detected by using the expressions (31), (32). A threshold for detecting whether the detection signals S21, S22 of the bridge circuit 90 are abnormal or not is set in consideration of the fact that accuracy of the detection signals S23, S24 need only be high enough to correct the output of the AMR sensor 63.

Whether the detection signals S11 to S14 of the AMR sensor 63 are abnormal or not can be determined as usual based on the sum of the detection signals as given by the expressions (27a), (28a).

The pattern P5 will be described below. The pattern P5 is the case where both of the bridge circuits 70, 80 of the AMR sensor 63 are abnormal and it is therefore not guaranteed that all of the detection signals S11 to S14 of the AMR sensor 63 are normal. For example, in this case, none of the detection signals S11 to S14 may be output from the bridge circuits 70, 80 due to defective connection of the power supply terminal. In the case of the pattern P5, whether the detection signals S21 to S24 from the two bridge circuits 90, 100 of the GMR sensor 64 are abnormal or not can be detected as usual by using the expressions (29a), (30a).

A process similar to that for the pattern P5 is performed in the case of the pattern P6. The pattern P6 is the case where both of the bridge circuits 90, 100 of the GMR sensor 64 are abnormal and it is therefore not guaranteed that all of the detection signals S21 to S24 of the GMR sensor 64 are normal. For example, in this case, none of the detection signals S21 to S24 may be output from the bridge circuits 90, 100 due to defective connection of the power supply terminal. In this case, whether the detection signals S11 to S14 from the two bridge circuits 70, 80 of the AMR sensor 63 are abnormal or not can be detected as usual by using the expressions (27a), (28a).

A method for detecting abnormality by the three-signal abnormality detection method in the case where an abnormal deviation that can be specifically expected is included in a detection signal.

It is herein assumed that the bridge circuit 80 is abnormal (pattern P2) and whether the detection signals S11, S12 of the bridge circuit 70 are abnormal or not is detected without using the detection signals S13, S14 of the bridge circuit 80. Specifically, for example, the following patterns of abnormality are possible for the detection signals S11, S12 of the bridge circuit 70 of the AMR sensor 63. The detection signal S11 or the detection signal S12 may have abnormal amplitude, offset abnormality, or an abnormal phase. The detection signal S11 or the detection signal S12 may also have a combination of the above patterns. Patterns PA, PB of abnormality will be specifically described below. In the pattern PA, the detection signal S12 has abnormal amplitude. In the pattern PB, the detection signal S12 has offset abnormality.

In the case of detecting abnormality of the detection signal including an abnormal deviation, the three-signal abnormality detection method is preferably used as follows.

To be exact, the right sides of the expressions (31), (32) may not be 0 due to manufacturing variation of the sensor elements and abnormality such as defective connection. Accordingly, the left side of the expression (31) is defined as the difference S, and the left side of the expression (32) is defined as the difference C. In the three-signal abnormality detection method, abnormality of the detection signals S11 to S14, S21 to S24 is detected by obtaining the differences S, C.

$$\text{Difference } S = |S11 - (2 S21 \cdot S22)| \qquad (31a)$$

$$\text{Difference } C = |S12 - (S22^2 - S21^2)| \qquad (32a)$$

In order to show significance of the three-signal abnormality detection method, a conventional abnormality detection method using the sum of squares will be described as a comparative example.

The abnormality detection method using the sum of squares is conventionally used in addition to the abnormality detection method using the sum of signals in order to improve accuracy of abnormality detection. The abnormality detection method using the sum of squares is a detection method using characteristics of a trigonometric function. In this method, abnormality is detected by using such a property that the sum of the square of a sin component and the square of a cos component of a detection signal from a sensor element is constant in the whole angle region. This can be given by the following expression (35), where "CONST" means a constant value. For example, the constant value "CONST" is decided by the amplitude of the detection signals S11, S12.

$$(S11^2 + S12^2) = CONST \tag{35}$$

The sum of squares, P, is given by the following expression (35a).

$$\text{Sum of squares } P = (S11^2 + S12^2) - CONST \tag{35a}$$

The sum of squares P is 0 in ideal conditions, but may not be 0 due to variation or abnormality of the sensor elements. For example, the sum of squares P of the detection signals S21, S22 may be calculated in addition to the sum of squares P of the detection signals S11, S12. The expression of this calculation is omitted herein.

There is a deviation between the calculated angle θo given by the expression (10) and the actual mechanical angle θ due to manufacturing variation of the sensor elements etc. A deviation between the calculated angle θo calculated based on the detection signals S11 to S14, S21 to S24 and the actual mechanical angle θ is herein defined as the electrical angle deviation E. The electrical angle deviation E is given by the following expression (36) using the calculated angle θo.

$$\text{Electrical angle deviation } E = \theta \cdot Y - \theta o \tag{36}$$

It is only necessary to be able to determine that there is abnormality by calculating the difference C and the difference S when there is the electrical angle deviation E (when the value of the electrical angle deviation E is large).

First, an example in which all the detection signals are normal will be described.

Figure 10:
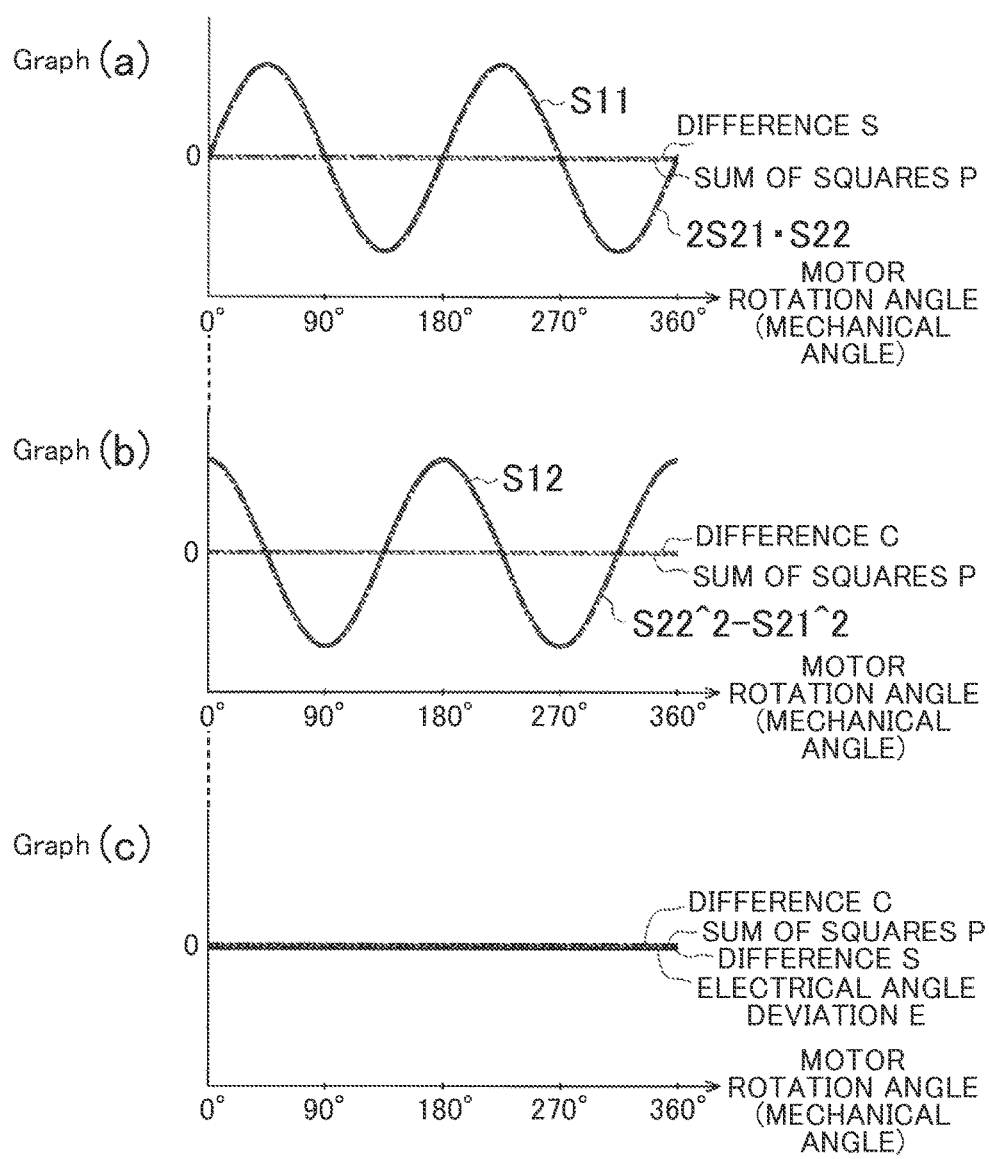
FIG. 10 shows in Graphs A to C a difference value of a three-signal abnormality detection method and a difference value of an abnormality detection method using the sum of squares in the case of using ideal sensor elements.

The difference C, the difference S, the sum of squares P, and the electrical angle deviation E in the case where there is no abnormality and ideal sensor elements are used as shown in FIG. 10 will be described. As shown by a continuous line in Graph A of FIG. 10, in the case where there is no abnormality, the detection signal S11 is a sine wave given by the expression (1). As shown by an alternate long and short dash line in Graph A of FIG. 10, "2S21·S22" as the second term of the left side of the expression (31) is also a sine wave that follows exactly the same track as the detection signal S11. Accordingly, the difference S given by the expression (31a) is always 0 regardless of the mechanical angle θ, as shown by a long dashed double-short dashed line in Graph A of FIG. 10. The sum of squares P shown in Graph A of FIG. 10 is calculated by the expression (35a). Since the detection signals S11, S12 do not have a deviation, the sum of the squares of the values of the detection signals S11, S12 is 1, and the sum of squares P of the detection signals S11, S12 is always 0 regardless of the mechanical angle θ.

As shown by a continuous line in Graph B of FIG. 10, the detection signal S12 is a cosine wave given by the expression (2). As shown by a long dashed double-short dashed line in Graph B of FIG. 10, the value of "S22^2−S21^2" as the second term of the left side of the expression (32) is also a cosine wave that follows the same track as the detection signal S12. Accordingly, the difference C is always 0 regardless of the mechanical angle θ, as shown by an alternate long and short dash line in Graph B of FIG. 10. The sum of squares P shown by a dashed line in Graph B of FIG. 10 is also always 0 regardless of the mechanical angle θ for the same reason as that for the detection signal S12.

In the case where there is no abnormality, the difference C, the difference S, the sum of squares P, and the electrical angle deviation E are always 0 regardless of the mechanical angle θ, as shown in Graph C of FIG. 10. In ideal conditions where there is no manufacturing variation of the sensor elements and there is no abnormality, the electrical angle deviation E is 0.

In the case where the electrical angle deviation E is 0, the difference C and the difference S are also 0. Accordingly, if the difference C and the difference S are larger than their certain thresholds, it is determined that there is abnormality. Abnormality can thus be detected.

The pattern PA will be described below.

The pattern PA is the case where such abnormality occurs that the amplitude A of the detection signal S12 of the AMR sensor 63 is multiplied by a certain coefficient. The detection signal S12 can be given by the following expression (2a), where "A" represents amplitude, and "x" represents a coefficient having a value larger than 1.

$$S12 = Ax \cos 2\theta ea \tag{2a}$$

When abnormality occurs in the amplitude A of the detection signal S12, the difference C, the difference S, the sum of squares P, and the electrical angle deviation E change according to the amplitude.

Figure 11:
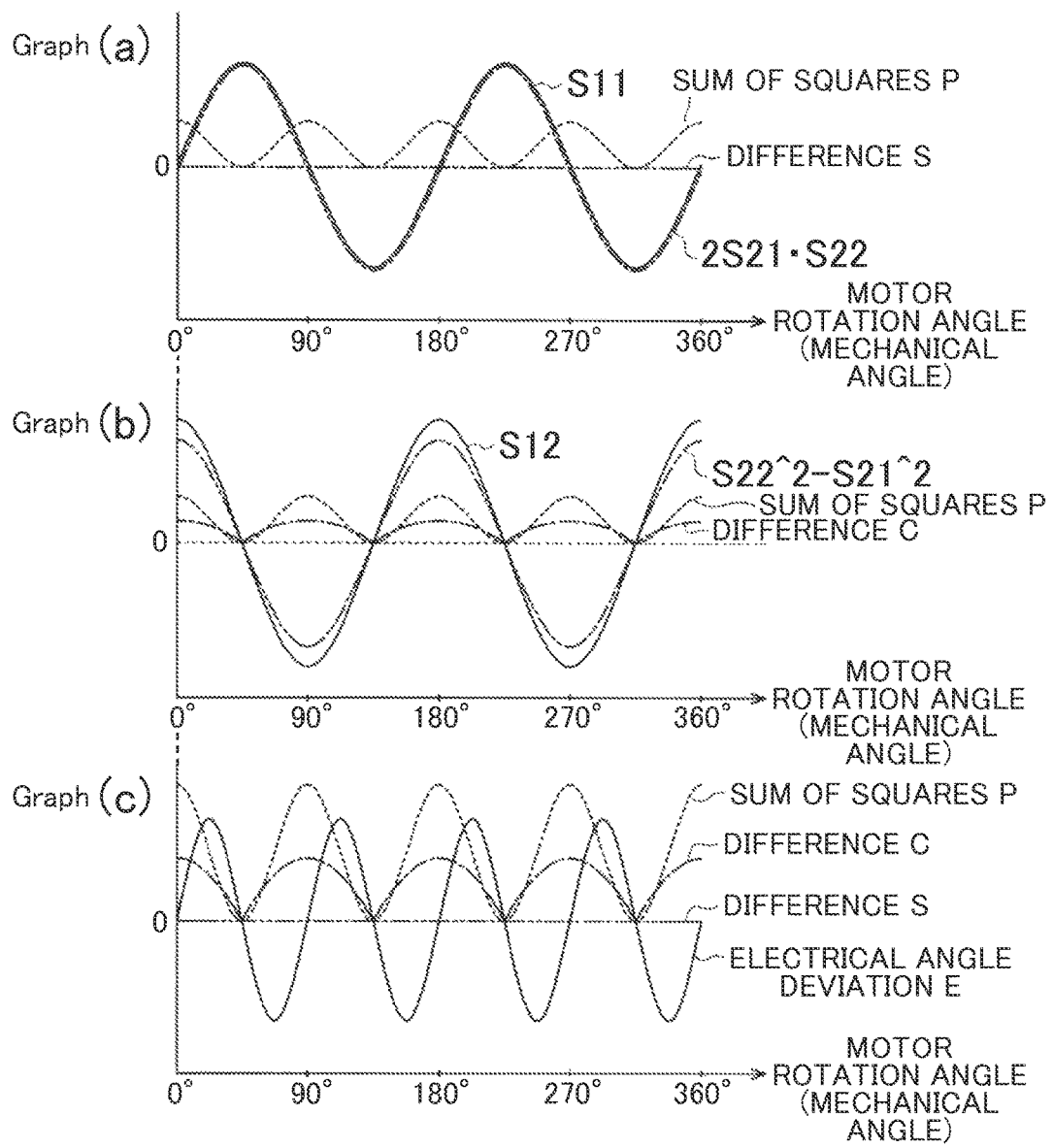
FIG. 11 shows in Graphs A to C a difference value of a three-signal abnormality detection method and a difference value of an abnormality detection method using the sum of squares.

First, how the difference S and the sum of squares P change will be described with reference to Graph A of FIG. 11. In this case, the detection signal S12 has abnormal amplitude A. Since the detection signal S11 does not have offset abnormality, the detection signal S11 given by a continuous line in Graph A of FIG. 11 is a sine wave that can be given by the expression (1) as in the case where the detection signal S11 is normal. As shown by an alternate long and short dash line in Graph A of FIG. 11, "2S21·S22" as the second term of the left side of the expression (31) is also a sine wave that follows exactly the same track as the detection signal S11 as in the case where the detection signal S11 is normal. This is because the detection signals S21, S22 of the GMR sensor 64 do not have abnormal amplitude. As shown by a long dashed double-short dashed line in Graph A of FIG. 11, the difference S calculated by the difference between the detection signal S11 and "2S21·S22" is always 0 regardless of the mechanical angle θ. Since the constant value CONST is given by the square of the amplitude A, the sum of squares P is given by the following expression (37).

$$P = (S11^2 + S12^2) - CONST = (Ax \cos 2\theta ea)^2 + (A \sin 2\theta ea)^2 - A^2 = (Ax \cos 2\theta ea)^2 + A^2 - (A \cos 2\theta ea)^2 - A^2 = (x^2 - 1)(A \cos 2\theta ea)^2 \tag{37}$$

The sum of squares P is a function that is proportional to $(A \cos 2\theta ea)^2$ and that always has a positive value.

Next, how the difference C and the sum of squares P change will be described with reference to Graph B of FIG. 11. The detection signal S12 shown by a continuous line in Graph B of FIG. 11 is the normal detection signal S12 with only its amplitude A multiplied by a coefficient x. The angle at the nodes of the cosine wave, namely the position of the mechanical angle θ, does not change.

The value of "$S22^2-S21^2$" shown by a long dashed double-short dashed line in Graph B of FIG. 11 follows the same track as the normal detection signal S12, namely the detection signal S12 with its amplitude A not multiplied by the coefficient x. The difference C shown by an alternate long and short dash line in Graph B of FIG. 11 can be given by the following expression (38).

$$C=|S12-(S22^2-S21^2)|=|Ax\cos 2\theta ea-A\cos 2\theta ea|=|(x-1)A\cos 2\theta ea| \qquad (38)$$

As shown by the expression (38), the difference C is represented by the absolute value of a function obtained by multiplying the amplitude A of the detection signal S12 by (x−1). The sum of squares P shown by a dashed line in Graph B of FIG. 11 is similar to that in Graph A of FIG. 11, and can be given by the expression (37).

An abnormality detection method in the case where the amplitude A is abnormal will be described with reference to Graph C of FIG. 11. As in Graphs A, B of FIG. 11, the difference C, the difference S, and the sum of squares P are shown by a alternate long and short dash line, a long dashed double-short dashed line, and a dashed line, respectively, in Graph C of FIG. 11.

Calculation of the electrical angle deviation E in the case of the abnormal amplitude A will be described. The electrical angle deviation E is the difference between the calculated angle θo calculated by the microcomputer 41 and the actual rotation angle of the rotary shaft 31a of the motor 31. For simplicity of description, it is herein assumed that the number Y of pole pairs is 1, the mechanical angle θ is in the range of 0° to 180°, and the coefficient x is 2. In this case, the electrical angle deviation E can be given by the following expression (39).

$$\text{Electrical angle deviation } E=\theta\cdot Y-\theta o\cdot Y=Y\{\theta-\arctan(\sin 2\theta ea/2\cos 2\theta ea)/2\} \qquad (39)$$

For example, when the mechanical angle θ is 60°, the arc tangent value "arctan(sin 2θea/2 cos 2θea)" in the second term of the expression (39) is arctan $\{(SQRT(3)/2)/(2\cdot\frac{1}{2})\}$. "SQRT" represents a square root. Since the arc tangent value "arctan(sin 2θea/2 cos 2θea)" is calculated as about 140°, the electrical angle deviation E is about 10° according to the expression (39). In the case where the detection signal S12 has normal amplitude A and the detection signal S12 is normal, the arc tangent value is "arctan $\{(SQRT(3)/2)/(2\cdot\frac{1}{2})\}$" and is therefore calculated as 120°. Accordingly, the electrical angle deviation E is 0° according to the expression (39). Even if the detection signal S12 has abnormal amplitude A, the arc tangent value is calculated as 90° when the mechanical angle θ is, e.g., 45°, and the electrical angle deviation E is 0°. As can also be seen from the expression (39), the electrical angle deviation E varies according to the mechanical angle θ.

The electrical angle deviation E is present because the detection signal S12 having abnormal amplitude A is used in a term of the expression (39) for calculating the calculated angle θo. The arc tangent value is normally "arctan(sin 2θea/cos 2θea)," but is "arctan(sin 2θea/2 cos 2θea)" in this case. Accordingly, the electrical angle deviation E is present except for the case where the mechanical angle θ is an integral multiple of 45°.

In the example shown in Graph C of FIG. 11, the difference C and the sum of squares P change significantly in the case where the electrical angle deviation E is large. Abnormality can therefore be detected by monitoring the difference C and the difference S. That is, abnormality can be detected by determining whether the difference C or the difference S is larger than a certain threshold. In this case, although abnormality can be detected by the sum of squares P, the use of the three-signal detection method has an advantage.

This advantage will be described below.

Figure 12:
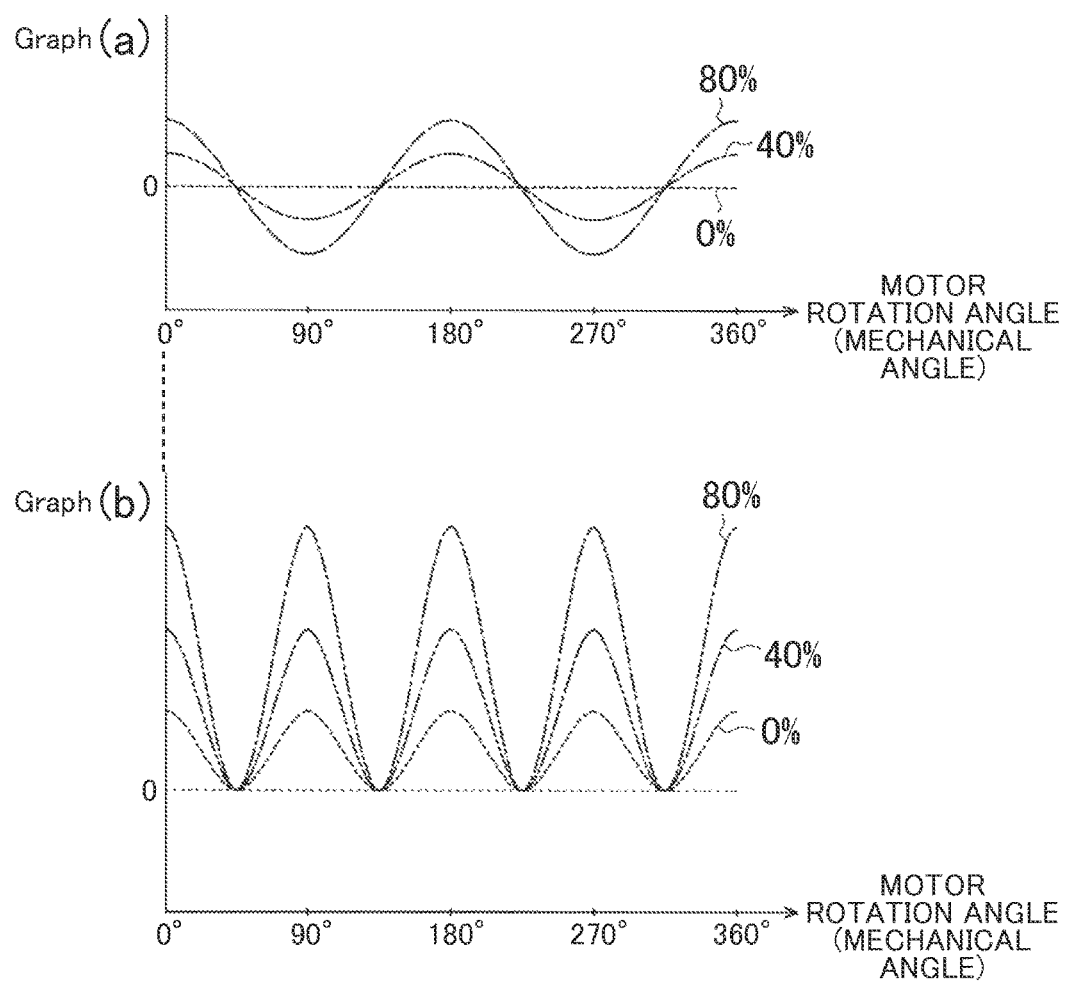
FIG. 12 shows in Graph A a difference value of a three-signal abnormality detection method in the case where an offset deviation is included, and shows in Graph B a difference value of an abnormality detection method using the sum of squares in the case where an offset deviation is included.

Graph A of FIG. 12 is a graph showing the difference C that is calculated in the case where the detection signal S12 has abnormal amplitude A. This will be described with respect to an example in which the amplitude A has a deviation of 0%, 40%, and 80%. In this case, the difference C can be calculated by the expression (38).

A dashed line in Graph A of FIG. 12 shows the case where the amplitude A of the detection signal S12 has a deviation of 0%. The detection signal S12 is given by the expression (2) (the coefficient x is 1), and the difference C calculated by the expression (38) is always 0.

A long dashed double-short dashed line in Graph A of FIG. 12 shows the case where the amplitude A of the detection signal S12 has a deviation of 40%. In this case, the amplitude A is 1.4 times that of the normal detection signal S12 (the coefficient x is 1.4), and the difference C can be given by the following expression (38a).

$$C=|0.4A\cos 2\theta ea| \qquad (38a)$$

An alternate long and short dash line in Graph A of FIG. 12 shows the case where the amplitude A of the detection signal S12 has a deviation of 80%. In this case, the amplitude A is 1.8 times that of the normal detection signal S12 (the coefficient x is 1.8), and the difference C can be given by the following expression (38b).

$$C=|0.8A\cos 2\theta ea| \qquad (38b)$$

Graph B of FIG. 12 is a graph showing the sum of squares P that is calculated when the detection signal S12 has abnormal amplitude A. In this case, the sum of squares P can be calculated by the expression (37). A dashed line in Graph B of FIG. 12 shows the case where the amplitude A of the detection signal S12 has a deviation of 0%. In this case, the coefficient x is 1, and the sum of squares P is therefore always 0.

A long dashed double-short dashed line in Graph B of FIG. 12 shows the case where the amplitude A of the detection signal S12 has a deviation of 40%. In this case, the amplitude A is 1.4 times that of the normal detection signal S12 (the coefficient x is 1.4), and the sum of squares P can be given by the following expression (37a).

$$P=0.96\cdot(A\cos 2\theta ea)^2 \qquad (37a)$$

An alternate long and short dash line in Graph B of FIG. 12 shows the case where the amplitude A of the detection signal S12 has a deviation of 80%. In this case, the amplitude A is 1.8 times that of the normal detection signal S12 (the coefficient x is 1.8), and the difference C can be given by the following expression (37b).

$$P=2.24\cdot(A\cos 2\theta ea)^2 \qquad (37b)$$

For simplicity of description, the three-signal abnormality detection method and the abnormality detection method using the sum of squares are compared for "(A cos 2θea)^2=1." In the case where the deviation is 0%, there is no difference between these methods. However, in the case where the deviation is 40%, the difference C is 0.4, whereas the sum of squares P is 0.96. In the case where the deviation is 80%, the difference C is 0.8, whereas the sum of squares P is 2.24. That is, in the abnormality detection method using the sum of squares, the larger the deviation of the amplitude A is, the larger the amount of increase in absolute value of the sum of squares P is as compared to the amount of increase in difference C. This is because the detection signal S12 having the deviation is squared to obtain the sum of squares P. The difference C and the sum of squares P are indices for detecting abnormality, and whether there is abnormality or not is determined based on whether the absolute value of the difference C and the absolute value of the sum of squares P are larger than a certain threshold. Accordingly, if the absolute value of the sum of squares P is larger than the absolute value of the difference C in the case where the amplitude A has a deviation, the threshold need be set to a larger value. This makes threshold design for the abnormality detection method using the sum of squares more difficult. In other words, threshold design is easier for the three-signal abnormality detection method than for the abnormality detection method using the sum of squares. For example, in the case where the acceptable deviation is up to 40%, the threshold is set to 0.96 for the abnormality detection method using the sum of squares, but is set to 0.4 for the three-signal abnormality detection method.

The pattern PB will be described below.

The pattern PB is the case where the detection signal S12 has offset abnormality. In this case, the detection signal S12 can be given by the following expression (2b), where "Offset" represents an offset value.

$$S12 = A\cos 2\theta ea + \text{Offset} \quad (2b)$$

The difference C, the difference S, the sum of squares P, and the electrical angle deviation E change when offset abnormality occurs in the detection signal S12.

First, how the difference S and the sum of squares P change will be described with reference to Graph A of FIG. 13. Since the detection signal S11 does not have abnormality, the detection signal S11 is a sine wave given by the expression (1) as shown by a continuous line in Graph A of FIG. 13. As shown by an alternate long and short dash line in Graph A of FIG. 13, "2S21·S22" as the second term of the left side of the expression (31) is also a sine wave that follows exactly the same track as the detection signal S11 as in the case where the detection signal S11 is normal. As shown by a long dashed double-short dashed line in Graph A of FIG. 13, the difference S is always 0 regardless of the mechanical angle θ. Since the constant value CONST is given by the square of the amplitude A, the sum of squares P is given by the following expression (40).

$$P = (A\cos 2\theta ea + \text{Offset})^2 - (A\cos 2\theta ea)^2 = \text{Offset}^2 + 2\text{Offset}\cdot A\cos 2\theta ea \quad (40)$$

Next, how the difference C and the sum of squares P change will be described with reference to Graph B of FIG. 13.

Figure 13:
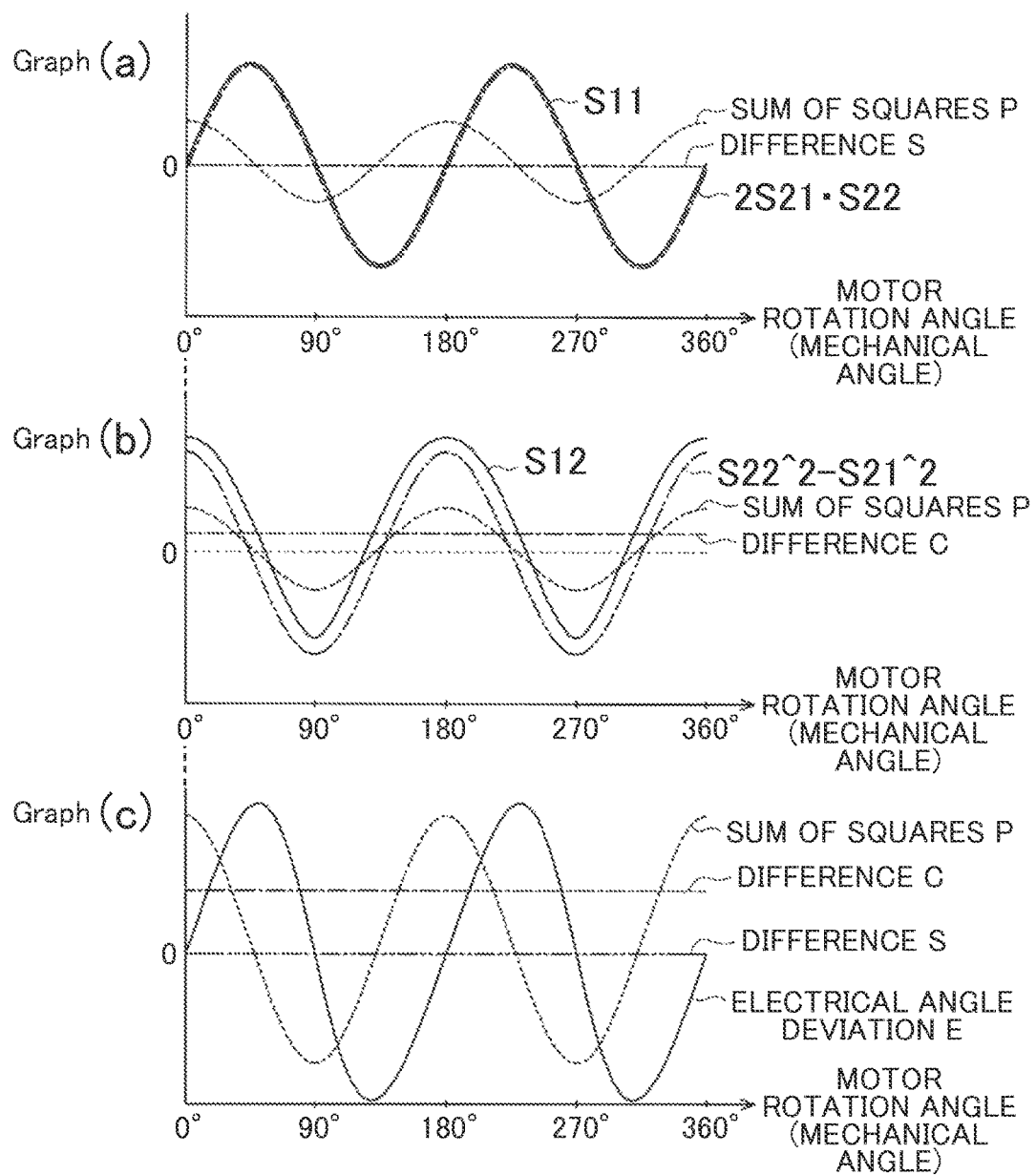
FIG. 13 shows in Graphs A to C a difference value of a three-signal abnormality detection method and a difference value of an abnormality detection method using the sum of squares in the case where an AMR element has an offset deviation.

As shown by a continuous line Graph B of FIG. 13, the detection signal S12 is the normal detection signal S12 with the offset value Offset added thereto and is given by the expression (2b). That is, the detection signal S12 is a certain function obtained by translating the normal detection signal S12 by an amount corresponding to the offset value Offset along the ordinate. As shown by a long dashed double-short dashed line in Graph B of FIG. 13, "S22^2−S21^2" follows the same track as the normal detection signal S12 and can be given by the expression (2).

In this case, the detection signal S12 and "S22^2−S21^2" are functions that are separated from each other by the offset value Offset along the ordinate and that change in the same manner. The difference C shown by an alternate long and short dash line in Graph B of FIG. 13 can therefore be given by the following expression (41).

$$C = |S12 - (S22^2 - S21^2)| = \text{Offset} \quad (41)$$

The sum of squares P shown by a dashed line in Graph B of FIG. 13 is similar to that shown in Graph A of FIG. 13 and can be given by the expression (40).

The abnormality detection method that is used for offset abnormality will be described with reference to Graph C of FIG. 13. As in Graphs A, B of FIG. 13, the difference C, the difference S, and the sum of squares P are shown by an alternate long and short dash line, a long dashed double-short dashed line, and a dashed line, respectively, in Graph C of FIG. 13.

Calculation of the electrical angle deviation E in the case of the offset abnormality will be described. For simplicity of description, it is herein assumed that the number Y of pole pairs is 1, the mechanical angle θ is in the range of 0° to 180°, and the offset value Offset is 0.5. In this case, the electrical angle deviation E can be given by the following expression (42).

$$E = \theta - \tfrac{1}{2}\cdot\arctan\{\sin 2\theta ea/(\cos 2\theta ea + 0.5)\} \quad (42)$$

This electrical angle deviation E is generated because the detection signal S12 having offset abnormality is used for the arc tangent value "arctan {sin 2θea/(cos 2θea+0.5)}" of the expression (39) for calculating the calculated angle θo. That is, the arc tangent value is normally "arctan(sin 2θea/cos 2θea)," but is "arctan {sin 2θea/(cos 2θea+0.5)}" in this case. For example, if the mechanical angle θ is 60°, the calculated angle θo is therefore 90°, and the electrical angle deviation E is 15°.

As shown in Graph C of FIG. 13, the electrical angle deviation E varies according to the mechanical angle θ due to the offset deviation. When the electrical angle deviation E varies, the difference C is translated in the positive direction with respect to 0 according to the offset deviation. Abnormality can therefore be detected by determining whether the difference C is larger than a certain threshold or not.

In the abnormality detection method using the sum of squares, the sum of squares P becomes equal to 0 or becomes close to 0 at some points even when the electrical angle deviation E varies significantly. If abnormality is to be detected by determining whether the sum of squares P is larger than a certain threshold or not, erroneous determination may be made (it may be determined that there is no abnormality, even though there is actually abnormality) when the sum of squares P is equal to 0 or close to 0. This is because the sum of squares P may be smaller than the certain threshold when the sum of squares P is equal to 0 or close to 0. In other words, in the abnormality detection method using the sum of squares, there are angle regions where it is difficult to detect abnormality. However, the difference C is translated in the positive direction with respect to 0 along the ordinate according to the offset deviation. Accordingly, by determining whether the difference C is larger than the certain threshold or not, abnormality can be reliably detected even in the regions where it is difficult to detect abnormality as the sum of squares P is equal to 0 or close to 0.

An example of the case where abnormality has occurred in the sensor element of the GMR sensor 64 will be described below.

In this example, it is assumed that offset abnormality has occurred in the detection signal S22. In the case where offset abnormality has occurred in the detection signal S22, the detection signal S22 can be given by the following expression (4a) instead of the expression (4).

$$S22 = A \cos \theta eg + \text{Offset} \quad (4a)$$

The difference C, the difference S, the sum of squares P, and the electrical angle deviation E change when offset abnormality occurs in the amplitude A of the detection signal S22. First, how the difference S and the sum of squares P change will be described with reference to Graph A of FIG. 14. Since the detection signal S11 does not have abnormality, the detection signal S11 is a sine wave given by the expression (1), as shown by a continuous line in Graph A of FIG. 14. As shown by an alternate long and short dash line in Graph A of FIG. 14, "2S21·S22" as the second term of the left side of the expression (31) is given by the product of the offset value Offset and the detection signal S21 in addition to "2S21·S22" used in the case where the detection signal S22 is normal. The difference S shown by a long dashed double-short dashed line in Graph A of FIG. 14 can therefore be given by the following expression (43).

$$S = |2S21 \cdot \text{Offset}| \quad (43)$$

Since the detection signals S11, S12 do not have abnormality, the sum of squares P is always 0 regardless of the mechanical angle θ.

Figure 14:
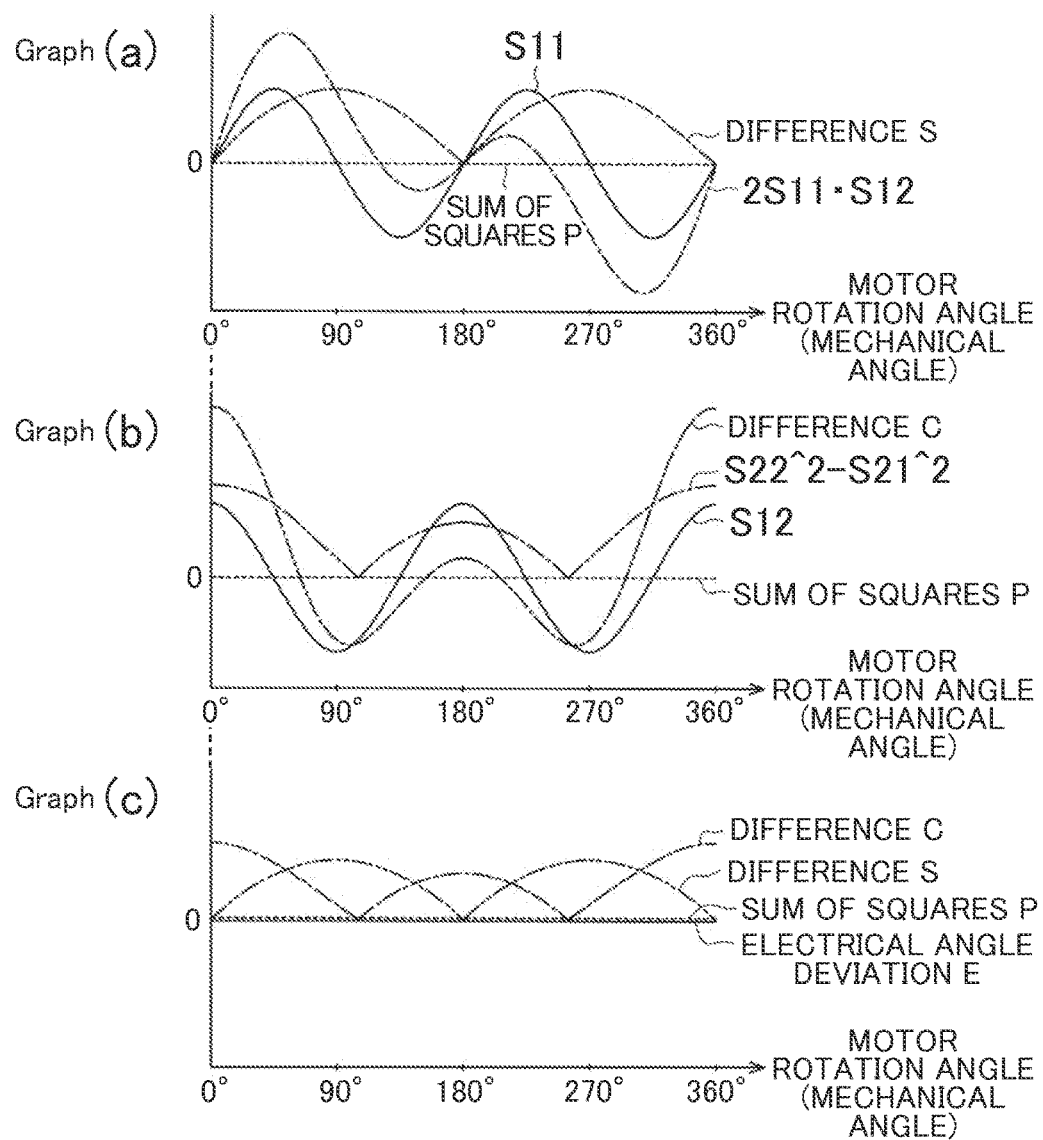
FIG. 14 shows in Graphs A to C a difference value of a three-signal abnormality detection method and a difference value of an abnormality detection method using the sum of squares in the case where a GMR element has an offset deviation.

Next, how the difference C and the sum of squares P change will be described with reference to Graph B of FIG. 14. The detection signal S12 shown by a continuous line in Graph B of FIG. 14 is given by the expression (2). "S22^2−S21^2" shown by a long dashed double-short dashed line in Graph B of FIG. 14 is given by the square of the offset value Offset and the product of twice the offset Offset and S22 in addition to "S22^2−S21^2" used in the case where the detection signal S22 is normal. The difference C shown by an alternate long and short dash line in Graph B of FIG. 14 can therefore be given by the following expression (44).

$$C = |\text{Offset}^2 + 2S22 \cdot \text{Offset}| \quad (44)$$

As in the case shown in Graph A of FIG. 14, the sum of squares P shown by a dashed line in Graph B of FIG. 14 is always 0 regardless of the mechanical angle θ.

Abnormality detection in the case where the detection signal S22 has offset abnormality will be described with reference to Graph C of FIG. 14. As in Graphs A, B of FIG. 14, the difference C, the difference S, and the sum of squares P are shown by an alternate long and short dash line, a long dashed double-short dashed line, and a dashed line, respectively, in Graph C of FIG. 14. Since the detection signal S22 is not directly related to calculation of the calculated angle θo, the electrical angle deviation E at this time is basically 0 regardless of the mechanical angle θ. For simplicity of description, determination of offset correction at the time the detection signal S22 has abnormality is omitted herein. If offset correction is taken into consideration, the calculated angle θo actually has a deviation, and the electrical angle deviation E is therefore affected by an offset deviation. At least one of the difference C and the difference S varies regardless of the mechanical angle θ, it can be detected that one of the detection signals S21, S22 output from the GMR sensor 64 is abnormal. That is, abnormality can be detected by determining whether the difference C and the difference S are larger than their certain thresholds.

Effects of the present embodiment will be described.

(1) The use of the three-signal abnormality detection method allows abnormality to be detected even when the abnormality detection method using the sum of signals cannot be used because abnormality has occurred in some of the sensor elements as in the patterns P1 to P6. In the three-signal abnormality detection method, whether the outputs of the AMR sensor 63 and the GMR sensor 64 are abnormal or not can be detected by monitoring whether the difference C and the difference S are smaller than their thresholds or not.

(2) Even if abnormality cannot be detected by the sum of squares (when the sum of squares P is equal to 0 or close to 0), abnormality can be more reliably detected by the three-signal abnormality detection method. For example, if the detection signal S12 has offset abnormality, the sum of squares P is equal to 0 or close to 0 at those mechanical angles θ at which the electrical angle deviation E varies significantly. At those mechanical angles θ at which the sum of squares P is equal to 0 or close to 0, erroneous determination may be made (it may be determined that there is no abnormality, even though the detection signal S12 is actually abnormal) because the sum of squares P may be smaller than the threshold. However, since each of the difference C and the difference S has a certain value at those mechanical angles θ at which the sum of squares P is equal to 0 or close to 0, abnormality can be easily detected by comparing the difference C and the difference S with their thresholds. Moreover, at least one of the difference C and the difference S varies significantly when the electrical angle deviation E varies significantly. Abnormality can therefore be more reliably detected.

(3) When abnormality is detected in calculation using sensor elements based on the same detection principles, similar abnormality may occur in the second sensor element when abnormality occurs in the first sensor due to disturbance. In the present embodiment, however, the sensor elements based on different detection principles are combined. Accordingly, similar abnormality is less likely to occur in the second sensor element even if abnormality occurs in the first sensor element.

In other words, the AMR element has anisotropic magnetoresistance, but the GMR element does not have anisotropic magnetoresistance. The magnetoresistance effects of the AMR element and the GMR element are phenomena that occur from different origins.

Redundancy of abnormality detection can therefore be improved, and more reliable detection of abnormality can be achieved.

(4) Since the three-signal abnormality detection method is used in addition to the abnormality detection method using the sum of signals, abnormality detection is less likely to be affected by deviations and threshold design can be facilitated as compared to the case of using the conventional abnormality detection method using the sum of squares. Moreover, the rotation angle detection device may be designed so that a signal is not detected as abnormal when the signal has a normal value but its absolute value is slightly large.

For example, in the abnormality detection method using the sum of squares, any deviation resulting from manufacturing variation of the sensor element is also squared. It is therefore necessary to set a larger threshold. In the three-signal abnormality detection method, however, amplification of a deviation is suppressed. Accordingly, abnormality detection is less likely to be affected by deviations, which can reduce the possibility that abnormality may be detected due to the deviation resulting from manufacture variation.

Even when many levels of threshold need be set in a small range, thresholds smaller than these thresholds need only be set for absolute values in the three-signal abnormality detection method. It is therefore easy to set the thresholds in the three-signal abnormality detection method. The use of the three-signal abnormality detection method can further improve abnormality detection accuracy.

The above embodiments may be combined as appropriate. The above embodiments may be modified as follows. Other embodiments shown below can be combined as appropriate as long as the combination is technically consistent with the present invention.

The above embodiments use the motor 31 having three pole pairs. However, the motor 31 may have any number Y of pole pairs. For example, even if the motor 31 having five pole pairs is used, the mechanical angle θ can be completely detected by correcting the output of the AMR sensor 63 as in Graph D of FIG. 5. Although the motor 31 having an odd number Y of pole pairs is mainly described in the above embodiments, the present invention is applicable to the motor 31 having an even number Y of pole pairs.

The above embodiments use a combination of the AMR sensor 63 having a shaft angle multiplier of 2× and the GMR sensor 64 having a shaft angle multiplier of 1×. However, the present invention is not limited to this combination. For example, a combination of a sensor element having a shaft angle multiplier of 3× and a sensor element having a shaft angle multiplier of 1× may be used.

The above embodiments use the GMR sensor 64 having a shaft angle multiplier of 1× to correct the output of the sensor element having a shaft angle multiplier of 2× or more. However, the sensor element having a shaft angle multiplier of 1× need not necessarily be used as a sensor for correction, depending on the number Y of pole pairs of the motor 31. That is, the sensor for correction can be any sensor element capable of completely detecting the mechanical angle θ of the motor 31. For example, in the case where the motor 31 has 10 pole pairs, a sensor element having a shaft angle multiplier of 2× can be used as the sensor for correction.

The fourth embodiment uses double-angle formulas of the addition theorem for the three-signal abnormality detection method. In the case of using a sensor element having a shaft angle multiplier of 3× as a main sensor with higher accuracy, abnormality detection may be conducted by using triple-angle formulas. In this case, the following expressions (45), (46) may be used for abnormality detection. Only the detection expressions for the difference S and the difference C are shown below.

$$\text{Difference } S = |S15 - (3S21 - 4S21\widehat{\;}3)| \tag{45}$$

$$\text{Difference } C = |S16 - (4S22\widehat{\;}3 - 3S22)| \tag{46}$$

Detection signals S15, S16 are given by the following expressions (47), (48) using an electrical angle θet.

$$S15 = A \sin 3\theta et \tag{47}$$

$$S16 = A \cos 3\theta et \tag{48}$$

The above embodiments use MR sensors such as the AMR sensor 63 and the GMR sensor 64. However, the present invention is not limited to this. For example, Hall elements or resolvers may be used.

In the above embodiments, the AMR sensor 63 and the GMR sensor 64 are disposed as shown in FIG. 2. However, the present invention is not limited to this. For example, the AMR sensor 63 and the GMR sensor 64 may be disposed on the same surface of the substrate 65.

The lower limit threshold θt1 and the upper limit threshold θt2 are set in the second embodiment. However, only one of the lower limit threshold θt1 and the upper limit threshold θt2 may be set.

In the second embodiment, only the AMR sensor 63 is a sensor element having variation. However, as shown Graph B of FIG. 7, the mechanical angle θ can be detected even if both the AMR sensor 63 and the GMR sensor 64 have variation.

The third embodiment uses the counter 42. However, any configuration may be used as long as the state of the mechanical angle θ can be recorded.

The third embodiment is described with respect to the case where the detection signals S21, S22 cannot be output due to failure of the GMR sensor 64. However, even if the detection signals S21, S22 are output, backup control may be performed by using the counter 42 if the detection signals S21, S22 obviously have abnormal values.

In the fourth embodiment, it is determined that there is abnormality if a calculated value is larger than a certain threshold as shown by, e.g., the expressions (31) to (34). However, it may be determined that there is abnormality if the calculated value is smaller than the certain threshold.

In the case of performing the backup control of the second embodiment in the fourth embodiment, it is preferable to continuously monitor the signals by the abnormality detection method using the sum of squares in addition to the abnormality detection method using the sum of signals. This is because the abnormality detection method using the sum of signals can detect abnormality but cannot specify the fault part. In the case of using both methods, backup control can be performed if abnormality is detected by the sum of signals and the fault part can be specified by the abnormality detection method using the sum of squares. If abnormality is detected by the sum of signals but the fault part cannot be specified by the abnormality detection method using the sum of squares, an accurate mechanical angle θ cannot be obtained, and application of an assist force is stopped. However, since sudden stop of application of the assist force causes an abrupt change in steering feeling, sudden stop of the motor 31 is controlled.

In the fourth embodiment, the three-signal abnormality detection method is used after the abnormality detection method using the sum of signals is performed. However, the three-signal abnormality detection method may be used from the start of abnormality detection.

In the fourth embodiment, the three-signal abnormality detection method is used in the case where whether abnormality has occurred or not cannot be determined by the abnormality detection method using the sum of signals. However, the present invention is not limited to this. For example, if abnormality has been detected by the sum of detection signals S11, S13, the three-signal abnormality detection method is used for both of the detection signals S11, S13. It can therefore be determined whether one of the detection signals S11, S13 or both of the detection signals S11, S13 has abnormality.

In the above embodiments, a certain threshold is set and abnormality is determined based on whether a given value is larger than the threshold or not or whether a given value is smaller than the threshold or not. However, the threshold having a specific range may be set as in the second embodiment with the lower limit threshold θt1 and the upper limit threshold θt2 of the second embodiment. Alternatively, the threshold may be set and abnormality is determined based on whether a given value is larger than or smaller than the threshold.

In the fourth embodiment, some specific examples of abnormal detection are described for the three-signal abnormality detection method. However, abnormal detection is not limited to those examples. For example, the use of the three-signal abnormality detection method is effective in the case where the detection signal S12 has an abnormal phase. Even when the sum of squares P crosses zero, the difference C or the difference S has a certain value. Abnormality can therefore be detected even when the detection signal S12 has an abnormal phase.

The above embodiments are described with respect to the rotation angle detection device to be mounted on an electric power steering system of a vehicle. However, the present invention is not limited to this. For example, the present invention is applicable to rotation angle detection devices for in-wheel motors, alternators, etc.

The technical idea that can be obtained by the above embodiments will be described below.

(i) The first sensor and the second sensor are driven by voltages supplied via different power supply paths.

According to this configuration, the sensors are driven via the different power supply paths. The sensors can therefore be driven by voltages suitable for each sensor. Moreover, even if abnormality such as wire disconnection may occur in one of the power supply paths for the first and second sensors, detection of the rotation angle can be continued by using the sensor that receives the voltage via the other power supply path. This improves redundancy.

What is claimed is:

1. A rotation angle detection device, comprising:
   a first sensor which generates a first electrical signal according to a rotation angle of an object to be detected and whose shaft angle multiplier N is an integer, the shaft angle multiplier N representing that the electrical signal changes by N periods for one period of the rotation angle;
   a second sensor which generates a second electrical signal according to the rotation angle of the object to be detected and whose shaft angle multiplier n is an integer smaller than the shaft angle multiplier N of the first sensor;
   a bias magnet which is rotatably fixed to the object and rotates relative to the first sensor and the second sensor, the first sensor facing the bias magnet, and the substrate being interposed between the first sensor and the second sensor; and
   a processor that calculates the rotation angle from the first and second electrical signals, wherein
   the processor calculates a first calculated angle from the first electrical signal, and calculates from the second electrical signal a second calculated angle that corresponds one-to-one to the rotation angle in a range of 0° to 360° that is a full rotation of the object to be detected, and
   when a difference between the first calculated angle multiplied by n/N and the second calculated angle reaches a set value that is set based on a product of n/N and 360°, the processor calculates a correction angle by making offset correction of adding an offset value corresponding to the set value to the first calculated angle multiplied by n/N, and calculates the rotation angle based on the correction angle.

2. The rotation angle detection device according to claim 1, wherein
   each of the first and second electrical signals includes a sine signal and a cosine signal.

3. The rotation angle detection device according to claim 1, wherein the shaft angle multiplier n of the second sensor is set to 1×.

4. The rotation angle detection device according to claim 1, wherein
   the bias magnet is a multipolar magnet that rotates together with the object to be detected, and
   the processor calculates the rotation angle by multiplying the correction angle and the number of pole pairs of the multipolar magnet.

5. The rotation angle detection device according to claim 1, wherein
   at least one of a lower limit threshold and an upper limit threshold is set as the set value, and
   the processor makes the offset correction when the difference between the first calculated angle multiplied by n/N and the second calculated angle is larger than the lower limit threshold or smaller than the upper limit threshold.

6. The rotation angle detection device according to claim 1, further comprising:
   a counter that stores a counter value when an operational power supply is supplied to the processor, the counter value being a value showing whether the offset correction has been made or not, wherein
   if the second calculated angle is abnormal, the processor makes the offset correction based on the counter value and updates the counter value every time the first calculated angle advances by one period.

7. The rotation angle detection device according to claim 1, wherein
   two of the first sensors and two of the second sensors are provided,
   the two first sensors generate electrical signals having a phase difference of 180° from each other, and
   the two second sensors generate electrical signals having a phase difference of 180° from each other.

8. The rotation angle detection device according to claim 1, wherein
   the processor includes an abnormality detection circuit,
   the abnormality detection circuit calculates an abnormality detection value based on an addition theorem of a trigonometric function by using the first calculated angle and the second calculated angle to detect abnormality based on a relationship between the abnormality detection value and a predetermined threshold.

9. The rotation angle detection device according to claim 8, wherein
   the shaft angle multiplier of the first sensor is 2×, and the shaft angle multiplier of the second sensor is 1×,
   the first electrical signal includes a first sine signal and a first cosine signal, and the second electrical signal includes a second sine signal and a second cosine signal,
   the processor calculates as the abnormal detection value a first difference value and a second difference value, the first difference value being an absolute value of a difference between a difference between a square of the second cosine signal and a square of the second sine signal and the first cosine signal, the second difference value being an absolute value of a difference between twice a product of the second sine signal and the second cosine signal and the first sine signal, and
   abnormality of the first electrical signal or the second electrical signal is detected when the first difference value or the second difference value is larger than the predetermined threshold.

10. The rotation angle detection device according to claim 1, wherein
    the first sensor is an anisotropic magnetoresistive (AMR) sensor having a shaft angle multiplier of 2×, and the second sensor is a giant magnetoresistive (GMR) sensor having a shaft angle multiplier of 1×.

11. The rotation angle detection device according to claim 1, wherein
the first sensor and the second sensor are mounted in a housing opposite to the object to be detected, which is configured to rotate relative to the first sensor and the second sensor.

12. The rotation angle detection device according to claim 1, wherein
the first sensor and the second sensor are mounted to a substrate that is fixed to the housing.

13. The rotation angle detection device according to claim 1, wherein
the bias magnet, the first sensor, and the second sensor are disposed on a rotation axis of the object.

* * * * *